US012244817B2

(12) United States Patent
Liu et al.

(10) Patent No.: US 12,244,817 B2
(45) Date of Patent: *Mar. 4, 2025

(54) SYMMETRIC MOTION VECTOR DIFFERENCE CODING

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Zhipin Deng, Beijing (CN); Yue Wang, Beijing (CN)

(73) Assignees: BEIJING BYTEDANCE NETWORK TECHNOLOGY CO., LTD., Beijing (CN); BYTEDANCE INC., Los Agneles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,247

(22) Filed: Oct. 17, 2023

(65) Prior Publication Data
US 2024/0056584 A1 Feb. 15, 2024

Related U.S. Application Data

(63) Continuation of application No. 17/729,404, filed on Apr. 26, 2022, now Pat. No. 11,792,406, which is a (Continued)

(30) Foreign Application Priority Data

Apr. 28, 2019 (WO) ................ PCT/CN2019/084768
May 16, 2019 (WO) ................ PCT/CN2019/087201
Jul. 5, 2019 (WO) ................ PCT/CN2019/094954

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/176* (2014.11); *H04N 19/70* (2014.11)

(58) Field of Classification Search
CPC .... H04N 19/105; H04N 19/137; H04N 19/52; H04N 19/577; H04N 19/70
See application file for complete search history.

(56) References Cited

U.S. PATENT DOCUMENTS 10,448,010 B2   10/2019   Chen et al.
10,462,462 B2   10/2019   Chien et al.
(Continued)

FOREIGN PATENT DOCUMENTS

CN   104053001 A   9/2014
CN   104904217 A   9/2015
(Continued)

OTHER PUBLICATIONS

Algorithm Description for Versatile Video Coding and Test Model 5 (VTM5)—Jianle Chen, Yan Ye, Seung Hwan Kim; Joint Video Expert Team (JVET) of ITU-T SG 16 WP3 and ISO/IEC JTC 1/SC 29/WG 11; 14th Meeting: Geneva, CH, Mar. 19-27, 2019. (Year: 2019).*

(Continued)

*Primary Examiner* — Mainul Hasan
(74) *Attorney, Agent, or Firm* — Conley Rose, P.C.

(57) ABSTRACT

Symmetric motion vector difference coding is described. One example video processing method includes determining, for a conversion between a block of a current picture of video and a bitstream representation of the block, whether a symmetric motion vector difference (SMVD) mode is allowable for the block. Whether the SMVD mode is allowable depends on a derivation process of two target reference pictures of the current picture, which includes a first step for (Continued)

searching a forward target reference picture in the reference picture list 0 and searching a backward target reference picture in the reference picture list 1, and a second step for searching a backward target reference picture in the reference picture list 0 and searching a forward target reference picture in the reference picture list 1. Outputs of the first and second steps are independent of each other. The method further includes performing the conversion based on the determination.

20 Claims, 19 Drawing Sheets

Related U.S. Application Data continuation of application No. 17/411,204, filed on Aug. 25, 2021, now Pat. No. 11,463,703, which is a continuation of application No. PCT/CN2020/087551, filed on Apr. 28, 2020.

(51) Int. Cl.
    *H04N 19/176*     (2014.01)
    *H04N 19/70*     (2014.01)

(56) References Cited

U.S. PATENT DOCUMENTS

| | | | |
|---|---|---|---|
| 10,491,917 B2 | 11/2019 | Chen et al. | |
| 10,595,035 B2 | 3/2020 | Karczewicz et al. | |
| 10,701,366 B2 | 6/2020 | Chen et al. | |
| 11,463,703 B2 | 10/2022 | Liu et al. | |
| 2007/0092008 A1 | 4/2007 | Chang et al. | |
| 2009/0207915 A1 | 8/2009 | Yan et al. | |
| 2011/0293010 A1 | 12/2011 | Jeong et al. | |
| 2014/0016829 A1 | 1/2014 | Chen | |
| 2014/0185682 A1 | 7/2014 | Chen et al. | |
| 2015/0023418 A1 | 1/2015 | Shimada et al. | |
| 2016/0337662 A1 | 11/2016 | Pang et al. | |
| 2018/0091816 A1 | 3/2018 | Chien et al. | |
| 2018/0098089 A1 | 4/2018 | Chen et al. | |
| 2018/0199057 A1 | 7/2018 | Chuang et al. | |
| 2018/0278949 A1* | 9/2018 | Karczewicz | H04N 19/577 |
| 2019/0222848 A1 | 7/2019 | Chen et al. | |
| 2020/0045310 A1 | 2/2020 | Chen et al. | |
| 2020/0154124 A1* | 5/2020 | Lee | H04N 19/105 |
| 2020/0213594 A1 | 7/2020 | Liu et al. | |
| 2020/0213612 A1 | 7/2020 | Liu et al. | |
| 2020/0221117 A1 | 7/2020 | Liu et al. | |
| 2020/0244979 A1* | 7/2020 | Li | H04N 19/159 |
| 2020/0359029 A1 | 11/2020 | Liu et al. | |
| 2021/0029362 A1 | 1/2021 | Liu et al. | |
| 2021/0051339 A1 | 2/2021 | Liu et al. | |
| 2021/0076063 A1 | 3/2021 | Liu et al. | |
| 2021/0092435 A1 | 3/2021 | Liu et al. | |
| 2021/0185324 A1* | 6/2021 | Chen | H04N 19/463 |
| 2021/0385461 A1 | 12/2021 | Liu et al. | |
| 2022/0038732 A1* | 2/2022 | Jang | H04N 19/159 |

FOREIGN PATENT DOCUMENTS

| | | | |
|---|---|---|---|
| CN | 105917650 A | 8/2016 | |
| CN | 107409225 A | 11/2017 | |
| CN | 107534766 A | 1/2018 | |
| CN | 107925760 A | 4/2018 | |
| CN | 108293131 A | 7/2018 | |
| CN | 109417630 A | 3/2019 | |
| CN | 109479143 A | 3/2019 | |
| JP | 7303330 B2 | 7/2023 | |
| TW | 201832557 A | 9/2018 | |
| WO | 2018175720 A1 | 9/2018 | |
| WO | 2019064640 A1 | 4/2019 | |
| WO | WO-2020132272 A1 * | 6/2020 | H04N 19/105 |

OTHER PUBLICATIONS

"New Bi-Prediction Techniques for B Pictures Coding"—Xianyang Ji et al., 2004 IEEE International Conference on Multimedia and Expo (ICME) (Year: 2004).*
Bross, B., et al., "Versatile Video Coding (Draft 5)," Joint Video Experts Team (JVET) of ITU-T SG 16 WP 3 and ISO/ IEC JTC1/SC 29/WG 11, 14th Meeting: Geneva, CH, Mar. 19-27, 2019, JVET-N1001-v2, 361 pages.
vcgit.hhi.fraunhofer.de/jvet/VVCSoftware_VTM/tags/VTM-4.1, Jan. 9, 2024, 1 page.
Sethuraman, S., "CE9: Results of DMVR related Tests CE9.2.1 and CE9.2.2," Joint Video Experts Team (JVET) of ITU-T SG 16 WP 3 and ISO/IEC JTC1/SC 29/WG 11, 13th Meeting: Marrakech, MA, Jan. 9-18, 2019, JVET-M0147-v7, 12 pages.
"Series H: Audiovisual and Multimedia Systems, Infrastructure of audiovisual services—Coding of moving video, High efficiency video coding," ITU-T, Telecommunication Standardization Sector of ITU, H.265, Feb. 2018, 692 pages.
Rosewarne, C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11, 25th Meeting: Chengdu, CN, Oct. 14-21, 2016, JCTVC-Y1002, 70 pages.
Chen, J. et al., "Algorithm Description of Joint Exploration Test Model 7 (JEM 7)," Joint Video Exploration Team (JVET) of ITU-T SG 16 WP 3 and ISO/IEC JTC1/SC 29/WG 11, 7th Meeting: Torino, IT, Jul. 13-21, 2017, JVET-G1001-v1, 50 pages.
JEM-7.0: https://jvet.hhi.fraunhofer.de/svn/svn_HMJEMSoftware/tags/ HM-16.6-JEM-7.0, Jan. 9, 2024, 1 page.
Luo, J., et al., "CE4-related: Simplified symmetric MVD based on CE4.4.3," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0444-v2, 3 pages.
Bross, B., et al., "Versatile Video Coding (Draft 4)," Joint Video Experts Team (JVET) of ITU-T SG 16 WP 3 and ISO/ IEC JTC1/SC 29/WG 11, 13th Meeting: Marrakech, MA, JVET-M1001-v7, Jan. 9-18, 2019, 300 pages.
Huanbang, C., et al., "CE4: Symmetrical MVD mode (Test 4.5.1)," Joint Video Experts Team (JVET) of ITU-T SG 16 WP 3 and ISO/IEC JTC 1/SC 29/WG 11, 12th Meeting: Macao, CN, JVET-L0370-v1, Oct. 3-12, 2018, 4 pages.
Luo, J., et al., "CE2-related: Symmetric MVD Signaling," Joint Video Experts Team (JVET) of ITU-T SG 16 WP 3 and ISO/IEC JTC 1/SC 29/WG 11, 14th Meeting: Geneva, CH, JVET-N0235-r1, Mar. 19-27, 2019, 2 pages.
Bross, B., et al., "Versatile Video Coding (Draft 5)," Joint Video Experts Team (JVET) of ITU-T SG 16 WP 3 and ISO/ IEC JTC 1/SC 29/WVG 11, 14th Meeting: Geneva, CH, JVET-N1001-v10, Mar. 19-27, 2019, 407 pages.
Lee, H., et al., "Non-CE4: Simplification of decoding process for SMVD references indices," Joint Video Experts Team (JVET) of ITU-T SG 16 WP 3 and ISO/IEC JTC 1/SC 29/WG 11, 14th Meeting: Geneva, CH, JVET-N0472-v3, Mar. 19-27, 2019, 6 pages.
Lee, J., et al., "CE3: Simplification of MPM derivation (CE3-3.2)," Joint Video Experts Team (JVET) of ITU-T SG 16 WP 3 and ISO/IEC JTC 1/SC 29/WG 11, 14th Meeting: Geneva, Ch, JVET-N0134, Mar. 19-27, 2019, 4 pages.
Chen, J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11, 14th Meeting: Geneva, CH, JVET-N1002-v1, Mar. 19-27, 2019, 71 pages.
Lee, H., et al., "Non-CE4: Simplification of decoding process for SMVD reference indices," Joint Video Experts Team (JVET) of ITU-T SG 16 WP 3 and ISO/IEC JTC 1/SC 29/WG 11, 14th Meeting: Geneva, CH, Mar. 19-27, 2019, 6 pages.
International Search Report and Written Opinion from International Patent Application No. PCT/CN2020/087551 dated Jul. 7, 2020 (10 pages).

(56) References Cited

OTHER PUBLICATIONS

International Search Report and Written Opinion from International Patent Application No. PCT/CN2020/087535 dated Jul. 20, 2020 (10 pages).
Notice of Allowance from U.S. Appl. No. 17/729,404 dated Jun. 16, 2023.
Non Final Office Action from U.S. Appl. No. 17/729,404 dated Dec. 22, 2022.
Extended European Search Report from European Patent Application No. 20798918.7 mailed Jun. 1, 2022 (1 page).
Japanese Notification of Reasons for Refusal from Japanese Patent Application No. 2023-100212 dated May 21, 2024, 19 pages.
Document: JVET-M1001-v6, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, JVET-N0413_drafttext_v4, 300 pages.
Jang, H., et al., "AhG2: Mismatch Between Text Specification and Reference Software on SMVD," Document: JVET-N0470, [online], JVET-N0470 (version 3), Joint Video Experts Team (JVET) of ITU-T SG 16 WP 3 and ISO/IEC JTC 1/SC 29/WG 11, Mar. 23, 2019, pp. 1-3.
Notice of Allowance for Japanese Patent Application No. 2023-100212 dated Oct. 22, 2024, 8 pages.

* cited by examiner

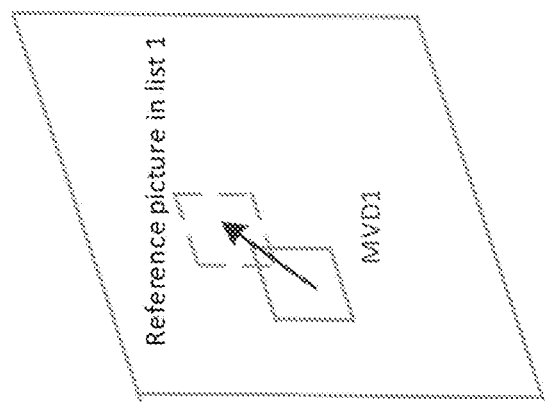
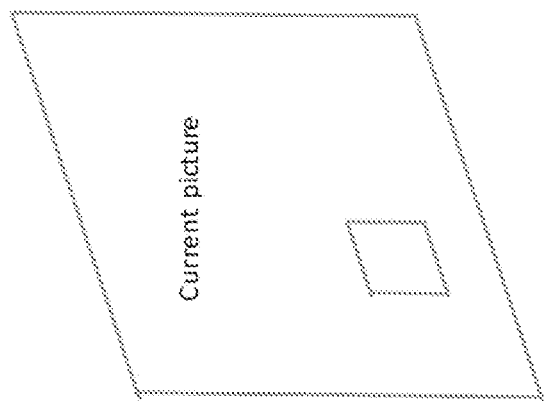
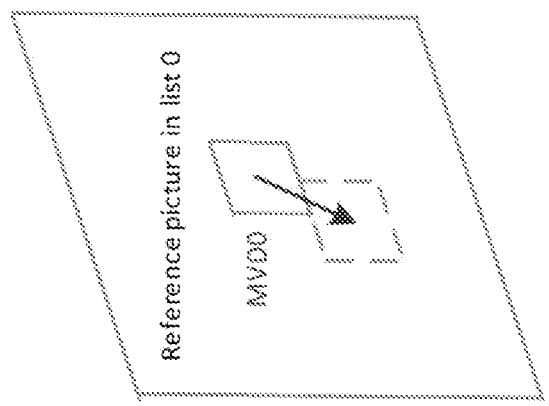
FIG. 13

1800 determining, for a conversion between a block of a current picture of video and a bitstream representation of the block, whether a symmetric motion vector difference (SMVD) mode is allowable for the block, wherein whether the SMVD mode is allowable depends on a derivation process of two target reference pictures of the current picture, which includes a first step for searching a forward target reference picture in the reference picture list 0 and searching a backward target reference picture in the reference picture list 1, and a second step for searching a backward target reference picture in the reference picture list 0 and searching a forward target reference picture in the reference picture list 1, outputs of the first step and the second step being independent of each other — 1802 performing the conversion based on the determination — 1804

FIG. 18

SYMMETRIC MOTION VECTOR DIFFERENCE CODING

CROSS-REFERENCE TO RELATED APPLICATION

This application is a continuation application of U.S. patent application Ser. No. 17/729,404, filed on Apr. 26, 2022, which is a continuation application of U.S. patent application Ser. No. 17/411,204, filed on Aug. 25, 2021, which is a continuation of International Patent Application No. PCT/CN2020/087551, filed on Apr. 28, 2020, which claims the priority to and benefits of International Patent Application No. PCT/CN2019/084768, filed on Apr. 28, 2019, International Patent Application No. PCT/CN2019/087201, filed on May 16, 2019, and International Patent Application No. PCT/CN2019/094954, filed on Jul. 5, 2019. All of the aforementioned patent applications are hereby incorporated by reference in their entireties.

TECHNICAL FIELD

The present disclosure relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present disclosure describes various embodiments and techniques in which video coding or decoding is performed using motion vector difference coding that uses a symmetric coding or decoding technique.

In one example aspect, a method of video processing is disclosed. The method includes determining to use, for a conversion between a current video block and a bitstream representation of the current video block, a symmetric motion vector difference (SMVD) mode in which two additional motion candidates generated for the conversion based on symmetric displacement of reference blocks in two target reference pictures from a reference list 0 and a reference list 1 of reference pictures and performing the conversion using the SMVD mode. The bitstream representation indicates to disable use of a motion vector difference (MVD) mode for one of the reference list 0 or the reference list 1.

In another example aspect, another method of video processing is disclosed. The method includes determining to use, for a conversion between a current video block and a bitstream representation of the current video block, a symmetric motion vector difference (SMVD) mode in which two additional motion candidates generated for the conversion based on symmetric displacement of reference blocks in pictures from two target reference pictures from a reference list 0 and a reference list 1 of reference pictures and performing the conversion using the SMVD mode. The bitstream representation includes a motion vector difference (MVD) information for the reference list 1.

In another example aspect, another method of video processing is disclosed. The method includes determining to use, for a conversion between a current video block and a bitstream representation of the current video block, a symmetric motion vector difference (SMVD) mode in which two additional motion candidates generated for the conversion based on symmetric displacement of reference blocks in pictures from a reference list 0 and a reference list 1 of reference pictures and performing the conversion using the SMVD mode. The SMVD generates the two additional motion candidates using a first step in which each reference picture list is parsed to identify target reference pictures.

In another example aspect, another method of video processing is disclosed. The method includes determining, based on a condition to use a symmetric motion vector difference (SMVD) mode in which two additional motion candidates generated for the conversion based on symmetric displacement of reference blocks in two target reference pictures from a reference list 0 and a reference list 1 of reference pictures, and a decoder side motion vector difference (DMVD) coding mode for a conversion between a current video block and a bitstream representation of the current video block and performing the conversion based on the determining.

In another example aspect, another method of video processing is disclosed. The method includes determining, based on a condition, whether or not to use an all-zero motion vector difference for a symmetric motion vector difference (SMVD) mode in which two additional motion candidates generated for the conversion based on symmetric displacement of reference blocks in two target reference pictures from a reference list 0 and a reference list 1 of reference pictures, and a decoder side motion vector difference (DMVD) coding mode for a conversion between a current video block and a bitstream representation of the current video block and performing the conversion based on the determining.

In another example aspect, another method of video processing is disclosed. The method includes selecting a first reference picture and a second reference picture from a plurality of reference pictures associated with a current video block, and performing, based on the selected first and second reference pictures, a conversion between the current video block and a bitstream representation of the current video block, wherein a first distance between the first reference picture and a current picture comprising the current video block and a second distance between the second reference picture and the current picture are equal.

In another example aspect, another method of video processing is disclosed. The method includes determining that a first distance between a first reference picture and a current picture comprising a current video block and a second distance between a second reference picture and the current picture are unequal, and disabling, based on the determining and for a conversion between the current video block and a bitstream representation of the current video block, a symmetric motion vector difference (SMVD) mode for the current video block.

In another example aspect, another method of video processing is disclosed. The method includes deriving, for a current video block, a first motion vector difference (MVD) of a first reference picture list based on a second MVD of a second reference picture list, and performing, based on the deriving, a conversion between the current video block and a bitstream representation of the current video block, wherein the a range of the first MVD is restricted.

In one example aspect, a method of video processing is disclosed. The method includes determining, for a conversion between a block of current picture of video and a bitstream representation of the first block, whether a symmetric motion vector difference (SMVD) mode is allowable for the block based on coding information of the block; and performing the conversion based on the determination.

In one example aspect, a method of video processing is disclosed. The method includes determining, for a conversion between a block of video and a bitstream representation of the first block, whether a symmetric motion vector (SMV) mode is allowable for the block according to the method of previous examples; and performing the conversion based on the determination.

In one example aspect, a method of video processing is disclosed. The method includes determining, for a conversion between a block of a current picture of video and a bitstream representation of the block, whether a symmetric motion vector difference (SMVD) mode is allowable for the block, wherein whether the SMVD mode is allowable depends on a derivation process of two target reference pictures of the current picture, which includes a first step for searching a forward target reference picture in the reference picture list 0 and searching a backward target reference picture in the reference picture list 1, and a second step for searching a backward target reference picture in the reference picture list 0 and searching a forward target reference picture in the reference picture list 1, outputs of the first step and the second step being independent of each other; and performing the conversion based on the determination.

In one example aspect, a method of video processing is disclosed. The method includes deriving, for a conversion between a block of a current picture of video and a bitstream representation of the block, a second motion vector difference (MVD) of one reference picture list from a first MVD associated with the other reference picture list, wherein an MVD includes both a horizontal component and a vertical component; applying a range restriction on at least one of the first MVD and the second MVD; and performing the conversion based on at least one of the restricted first MVD and the restricted second MVD.

In yet another example aspect, a video processing apparatus is disclosed. The apparatus includes a processor configured to perform an-above disclosed method. The apparatus may further perform video encoding or video decoding.

In yet another example aspect, a computer readable medium is disclosed. The medium has code for processor-implementation of the above-described methods stored on it.

These, and other, aspects are described in the present disclosure.

BRIEF DESCRIPTION OF THE DRAWINGS

FIG. 13 is an example illustration for symmetrical mode.

FIG. 18 is a flowchart for an example method of video processing.

DETAILED DESCRIPTION

Figure 1:
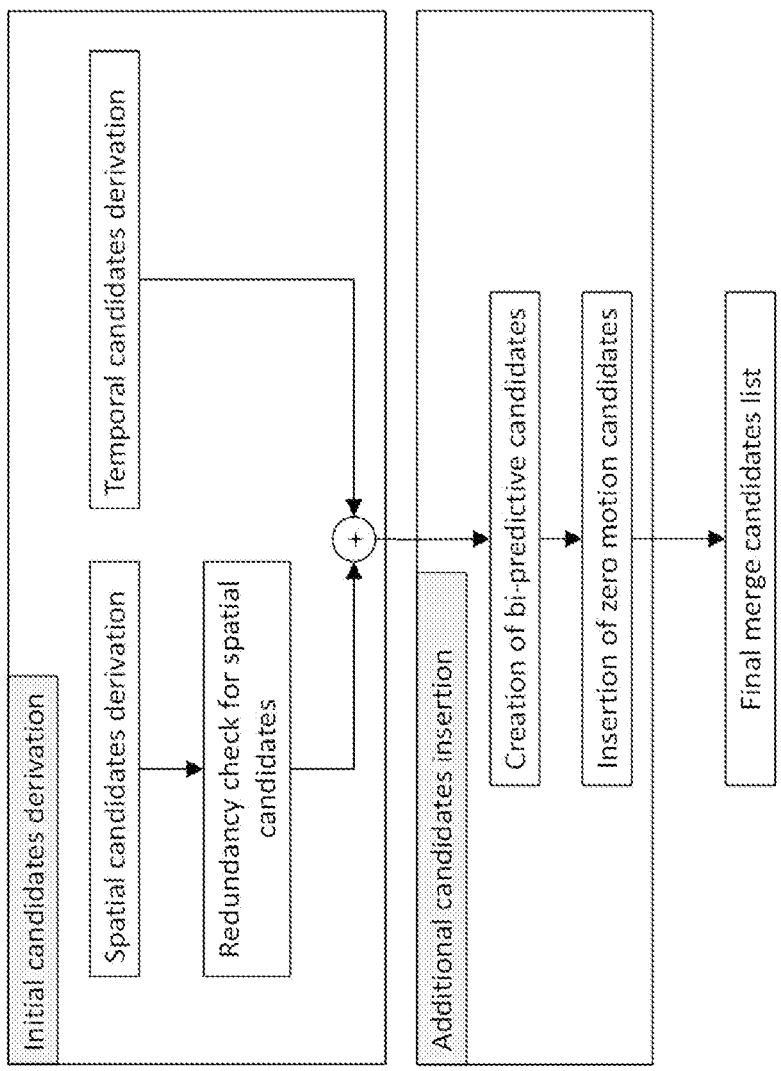
FIG. 1 depicts an example derivation process for merge candidates list construction.

Section headings are used in the present disclosure to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Summary

The present disclosure is related to video coding technologies. Specifically, it is related to symmetric motion vector difference coding. It may be applied to the existing video coding standard like High Efficiency Video Coding (HEVC), or the standard Versatile Video Coding (VVC) to be finalized. It may be also applicable to future video coding standards or video codec.

2. Initial Discussion

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/ MPEG-2 Video and H.264/ MPEG-4 Advanced Video Coding (AVC) and H.265/ HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC Joint Technical Committee (JTC)1 SC29/ WG11 (MPEG) was created to work on the VVC standard targeting at 50% bitrate reduction compared to HEVC.

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a coding unit (CU) is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/ AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode

2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:
  Step 1: Initial candidates derivation
    Step 1.1: Spatial candidates derivation
    Step 1.2: Redundancy check for spatial candidates
    Step 1.3: Temporal candidates derivation
  Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

FIG. 1 depicts an example derivation process for merge candidates list construction.

2.1.2.2 Spatial Candidates Derivation

Figure 2:
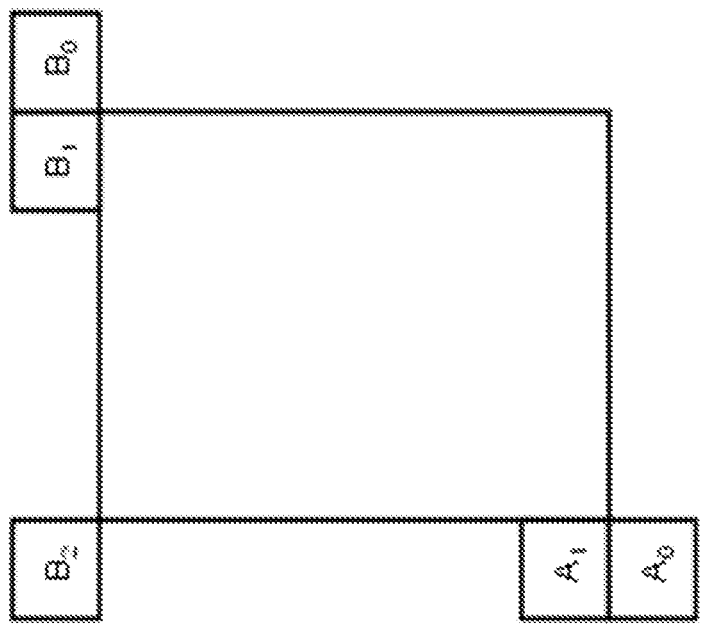
FIG. 2 shows examples of positions of spatial merge candidates.
Figure 3:
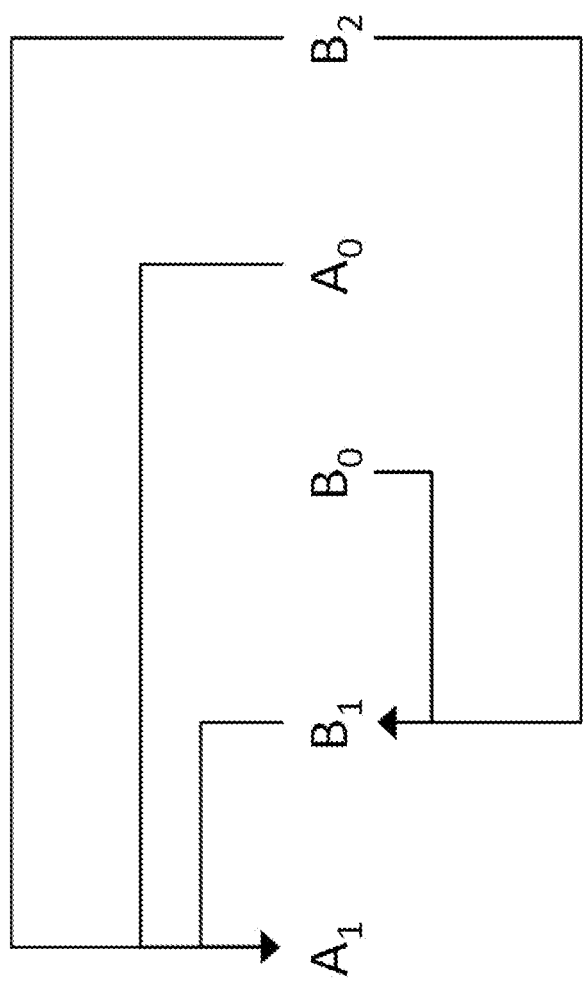
FIG. 3 shows examples of candidate pairs considered for redundancy check of spatial merge candidates.
Figures 4A, 4B:
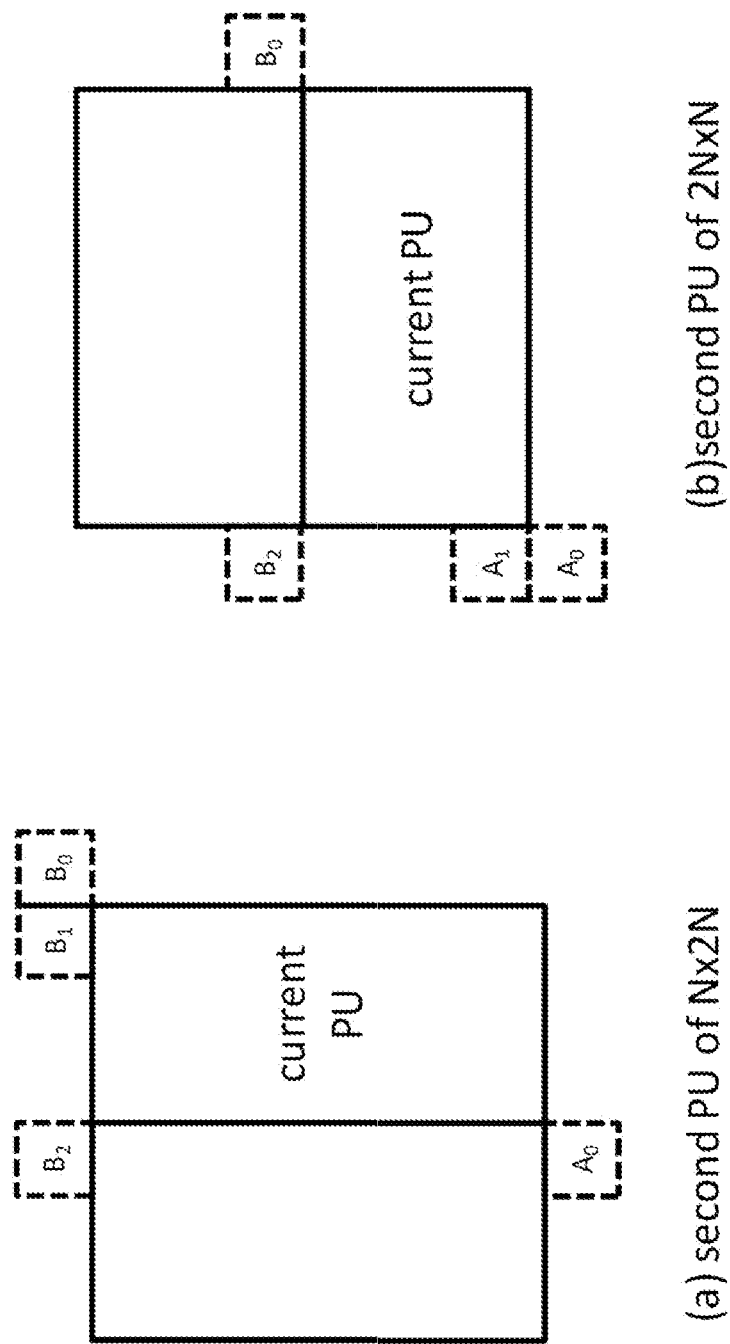
FIG. 4A-4B show example positions for the second prediction unit (PU) of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A-4B depict the second PU for the case of N×2N and 2N×N, respectively. When the current PU is partitioned as N×2N, candidate at position A1 is not considered for list construction. In fact, by adding this candidate will lead to two prediction units having the same motion information, which is redundant to just have one PU in a coding unit. Similarly, position B1 is not considered when the current PU is partitioned as 2N×N.

2.1.2.3 Temporal Candidates Derivation

Figure 5:
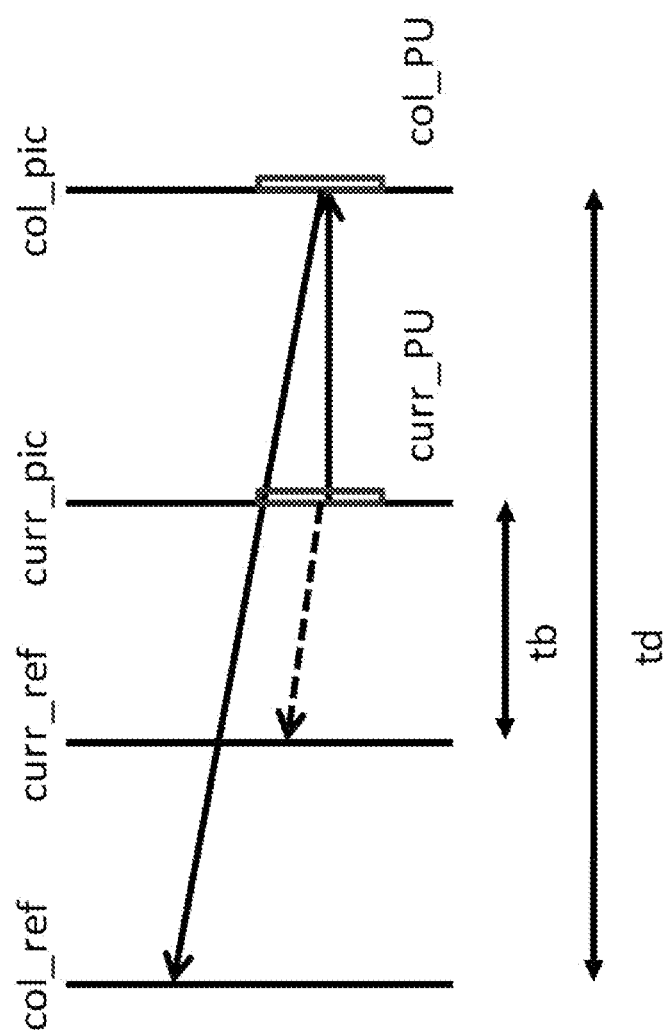
FIG. 5 is an illustration of motion vector scaling for temporal merge candidate.

In this step, only one candidate is added to the list. Particularly, in the derivation of this temporal merge candidate, a scaled motion vector is derived based on co-located PU belonging to the picture which has the smallest picture order count (POC) difference with current picture within the given reference picture list. The reference picture list to be used for derivation of the co-located PU is explicitly signalled in the slice header. The scaled motion vector for temporal merge candidate is obtained as illustrated by the dotted line in FIG. 5 which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
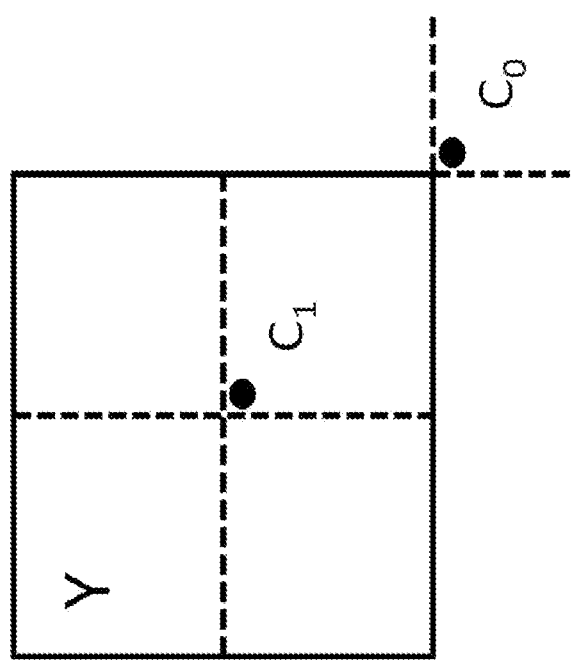
FIG. 6 shows examples of candidate positions for temporal merge candidate, C0 and C1.

In the co-located PU (Y) belonging to the reference frame, the position for the temporal candidate is selected between candidates C0 and C1, as depicted in FIG. 6. If PU at position C0 is not available, is intra coded, or is outside of the current coding tree unit (CTU, a.k.a., largest coding unit (LCU)) row, position C1 is used. Otherwise, position C0 is used in the derivation of the temporal merge candidate.

2.1.2.4 Additional Candidates Insertion

Figure 7:
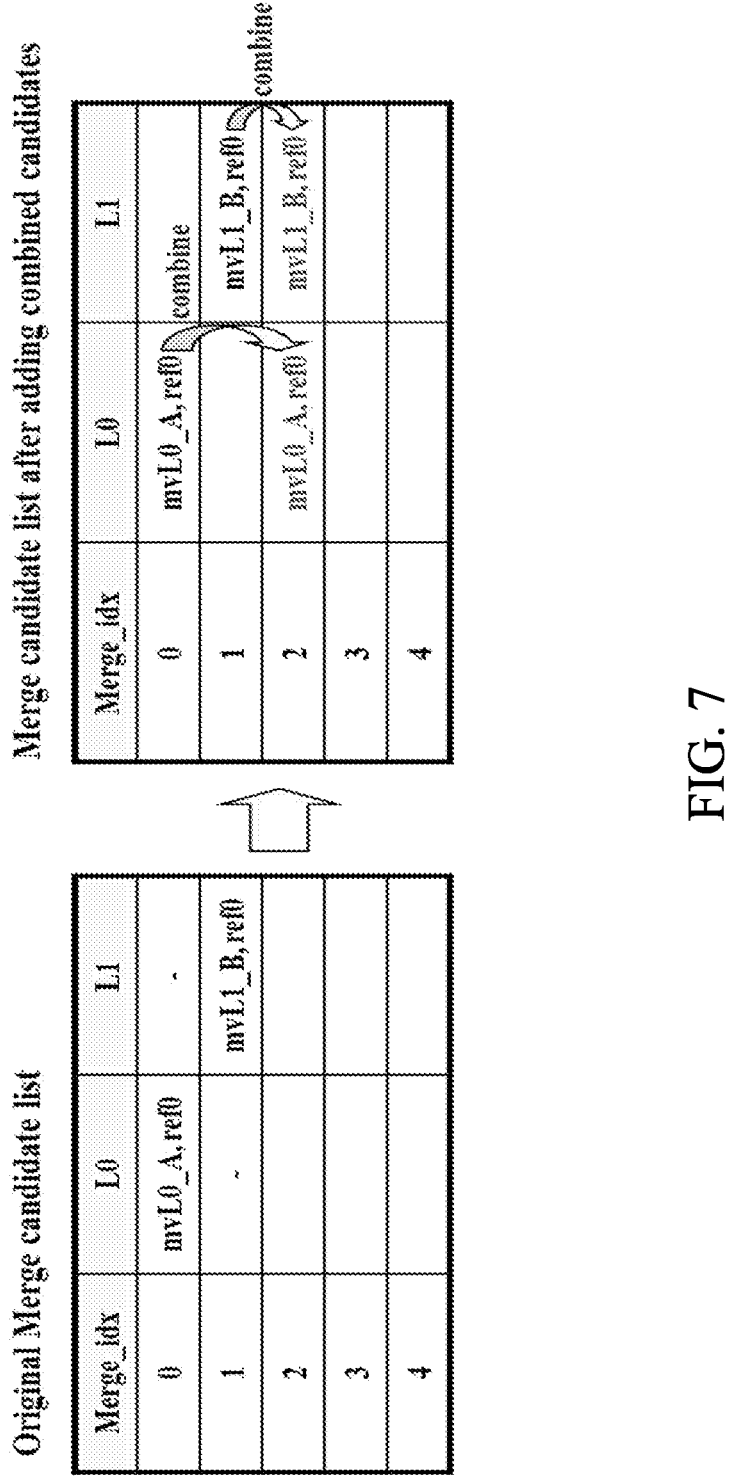
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly, with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
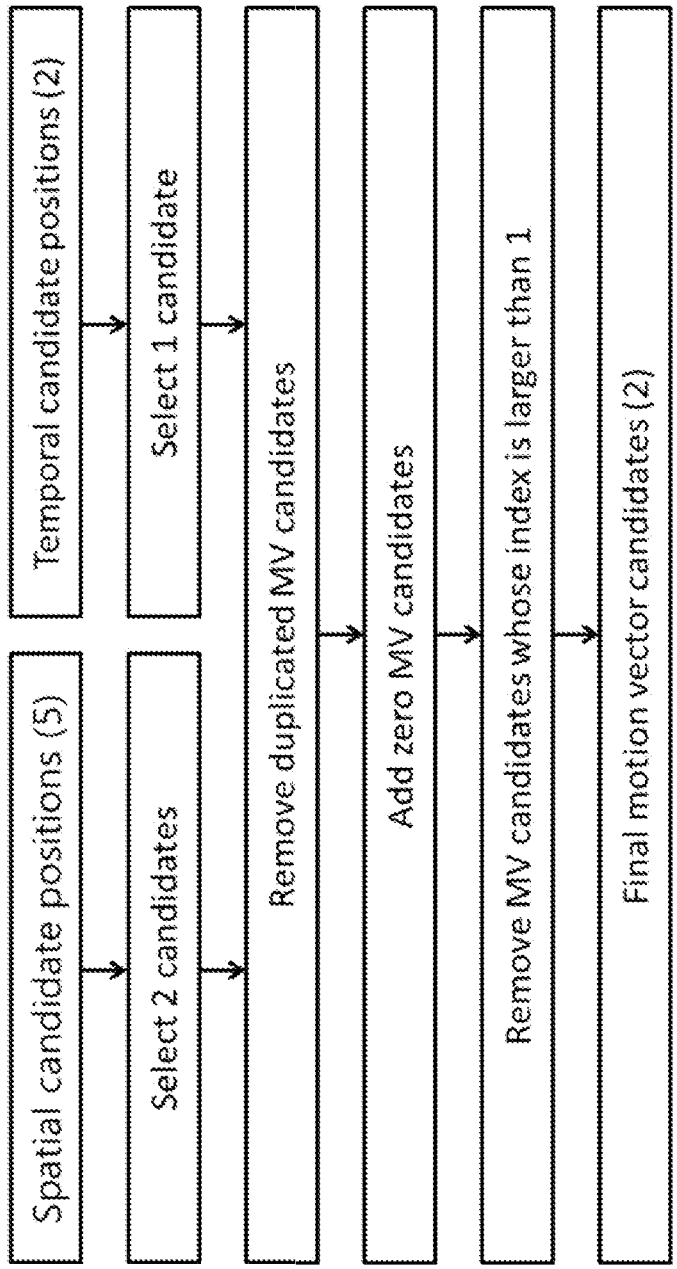
FIG. 8 summarizes derivation process for motion vector prediction candidate.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
   (1) Same reference picture list, and same reference picture index (same POC)
   (2) Different reference picture list, but same reference picture (same POC)

Spatial scaling
   (3) Same reference picture list, but different reference picture (different POC)
   (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
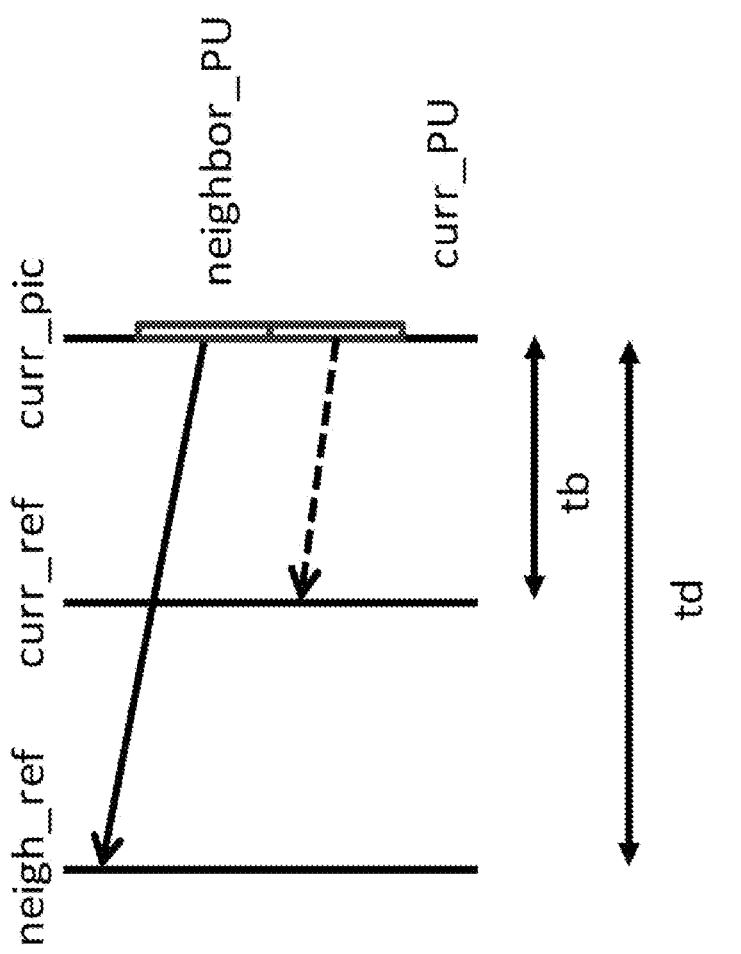
FIG. 9 shows an illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Inter Prediction Methods in VVC

There are several new coding tools for inter prediction improvement, such as Adaptive motion vector difference resolution (AMVR) for signaling MVD, affine prediction mode, Triangular prediction mode (TPM), Advanced TMVP (ATMVP, a.k.a., SbTMVP), Generalized Bi-Prediction (GBI), Bi-directional Optical flow (BIO).

2.2.1 Coding Block Structure in VVC

In VVC, a QuadTree/BinaryTree/MulitpleTree (QT/BT/TT) structure is adopted to divide a picture into square or rectangle blocks.

Besides QT/BT/TT, separate tree (a.k.a., Dual coding tree) is also adopted in VVC for I-frames. With separate tree, the coding block structure are signaled separately for the luma and chroma components.

2.2.2 Decoder-Side Motion Vector Refinement (DMVR)

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined.

2.2.2.1 DMVR in JEM

Figure 10:
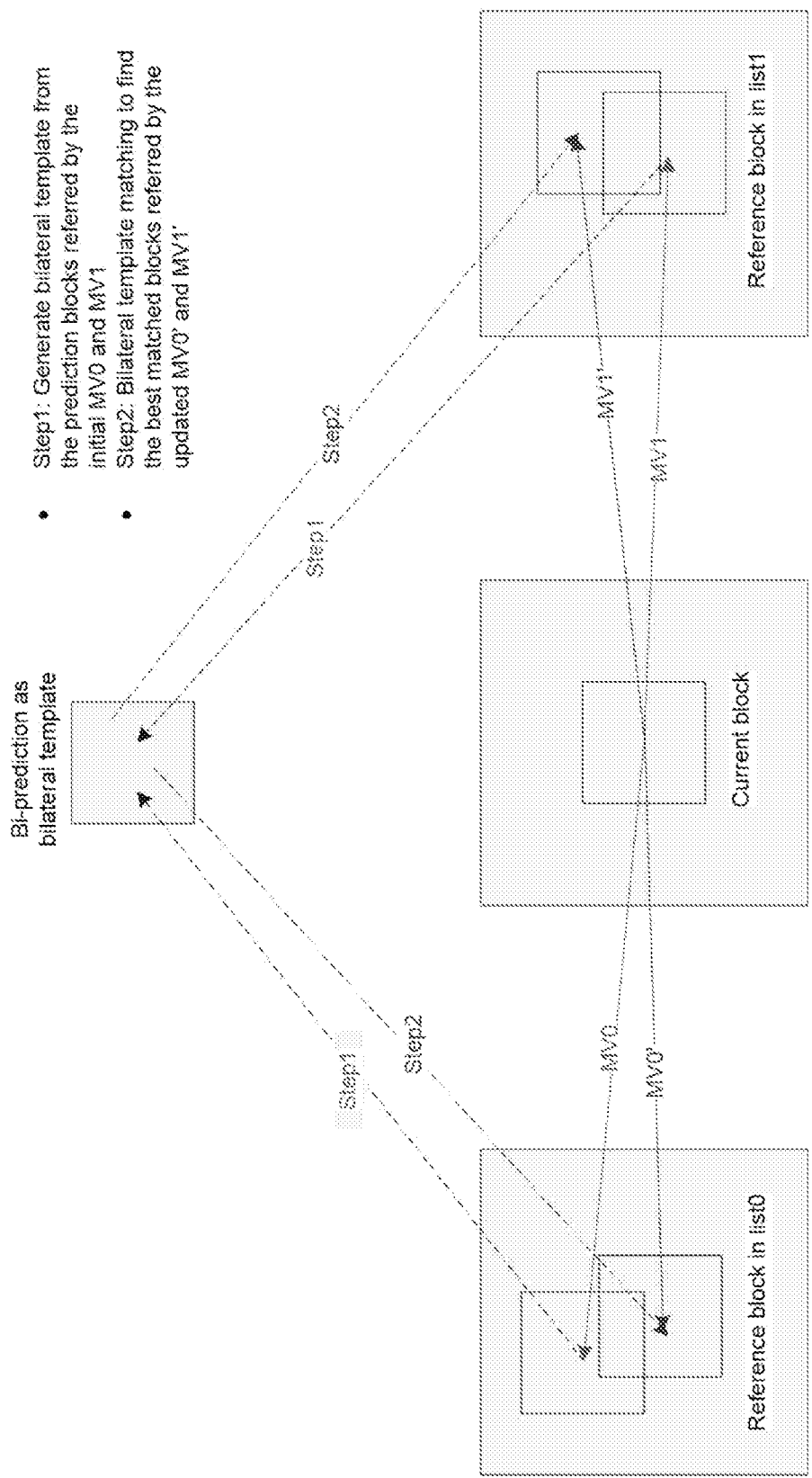
FIG. 10 shows an example of decoder side motion vector refinement (DMVR) based on bilateral template matching.

In JEM design, the motion vectors are refined by a bilateral template matching process. The bilateral template matching applied in the decoder to perform a distortion-based search between a bilateral template and the reconstruction samples in the reference pictures in order to obtain a refined MV without transmission of additional motion information. An example is depicted in FIG. 10. The bilateral template is generated as the weighted combination (i.e. average) of the two prediction blocks, from the initial MV0 of list0 and MV1 of list1, respectively, as shown in FIG. 10. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 10, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

2.2.2.2 DMVR in VVC

Figure 11:
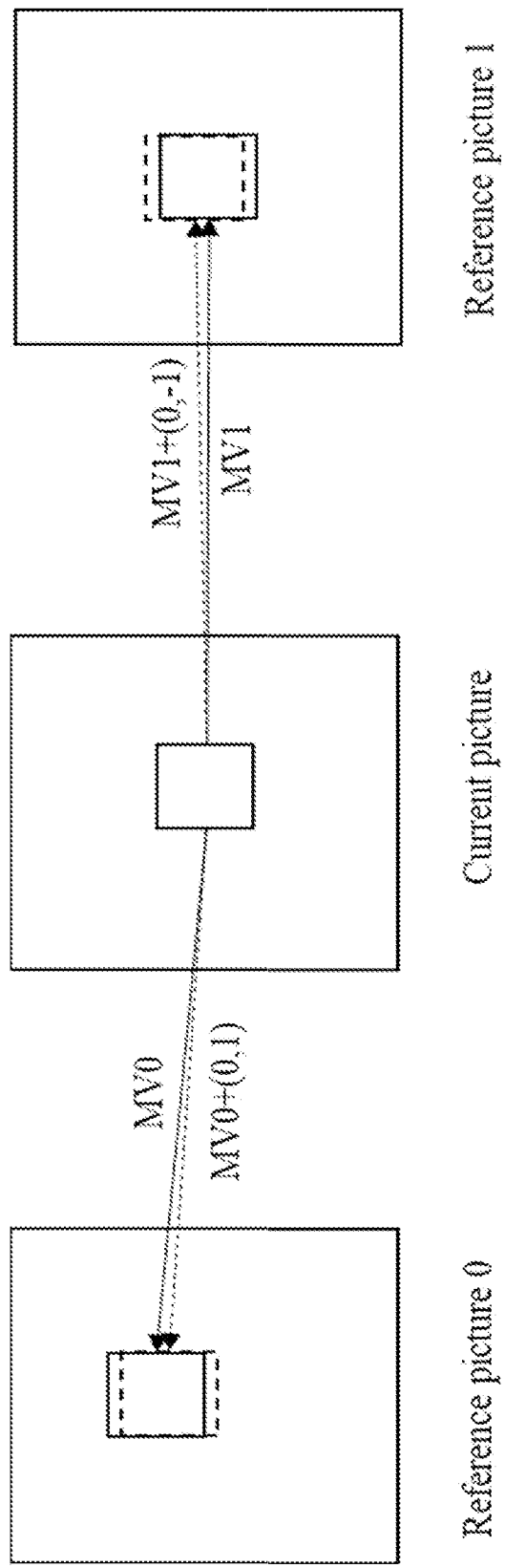
FIG. 11 shows an example of MVD (0, 1) mirrored between list 0 and list 1 in DMVR.

For DMVR in VVC, MVD minoring between list 0 and list 1 is assumed as shown in FIG. 11 and bilateral matching is performed to refine the MVs, i.e., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in the list 1 reference picture.

Figure 12:
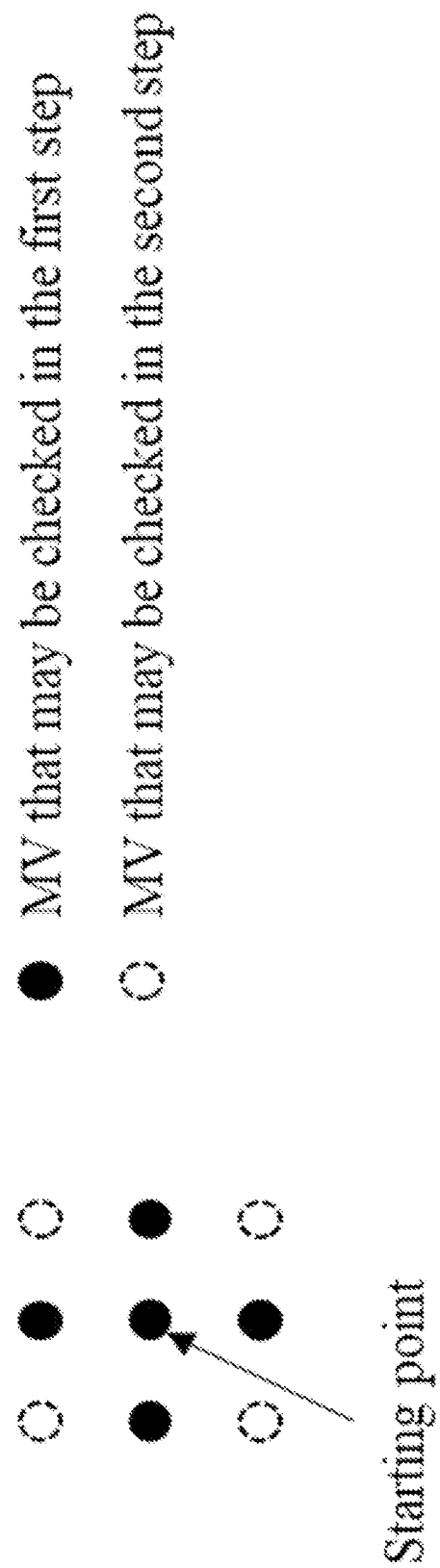
FIG. 12 shows examples of motion vectors (MVs) that may be checked in one iteration.

The motion vector refinement process may iterate twice. In each iteration, at most 6 MVDs (with integer-pel precision) may be checked in two steps, as shown in FIG. 12. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:

MvdX=−1;

MvdY=−1;

If (Sad(1, 0)<Sad(−1, 0))

MvdX=1;

If (Sad(0, 1)<Sad(0, −1))

MvdY=1;

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

To further simplify the process of DMVR, it proposed several changes to the design in JEM. More specifically, the adopted DMVR design to VVC test model (VTM)-4.0 (to be released soon) has the following main features:

- Early termination when (0,0) position SAD between list0 and list1 is smaller than a threshold.
- Early termination when SAD between list0 and list1 is zero for some position.
- Block sizes for DMVR: W*H>=64 && H>=8, wherein W and H are the width and height of the block.
- Split the CU into multiple of 16×16 sub-blocks for DMVR of CU size>16*16. If only width or height of the CU is larger than 16, it is only split in vertical or horizontal direction.
- Reference block size (W+7)*(H+7) (for luma).
- 25 points SAD-based integer-pel search (i.e. (+−) 2 refinement search range, single stage)
- Bilinear-interpolation based DMVR.
- "Parametric error surface equation" based sub-pel refinement. This procedure is performed only when the minimum SAD cost is not equal to zero and the best MVD is (0, 0) in the last MV refinement iteration.
- Luma/chroma motion compensation (MC) w/reference block padding (if needed).
- Refined MVs used for MC and TMVPs only.

2.2.2.2.1 Usage of DMVR

When the following conditions are all true, DMVR may be enabled:
DMVR enabling flag in the sequence parameter set (SPS) (i.e., sps_dmvr_enabled_flag) is equal to 1
TPM flag, inter-affine flag and subblock merge flag (either ATMVP or affine merge), MMVD flag are all equal to 0
Merge flag is equal to 1
Current block is bi-predicted, and POC distance between current picture and reference picture in list 1 is equal to the POC distance between reference picture in list 0 and current picture
The current CU height is greater than or equal to 8
Number of luma samples (CU width*height) is greater than or equal to 64

2.2.2.2.2 "Parametric Error Surface Equation" Based Sub-Pel Refinement

The method is summarized below:
1. The parametric error surface fit is computed only if the center position is the best cost position in a given iteration.
2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where $(x_0, y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E0(0,1))/(2((0,-1)+E(0,1)-2E(0,0)))$$

$(x_0, y_0)$ can be computed to any required sub-pixel precision by adjusting the precision at which the division is performed (i.e. how many bits of quotient are computed). For $1/16^{th}$-pel accuracy, just 4-bits in the absolute value of the quotient needs to be computed, which lends itself to a fast-shifted subtraction based implementation of the 2 divisions required per CU.
3. The computed $(x_0, y_0)$ are added to the integer distance refinement MV to get the sub-pixel accurate refinement delta MV.

2.2.3 Symmetric Motion Vector Difference

Symmetric motion vector difference (SMVD) is applied for motion information coding in bi-prediction.
Firstly, in slice level, variables RefIdxSymL0 and RefIdxSymL1 to indicate the reference picture index of list 0/1 used in SMVD mode, respectively, are derived with the following steps. When at least one of the two variables are equal to −1, SMVD mode shall be disabled.

8.3.5 Decoding Process for Symmetric Motion Vector Difference Reference Indices Output of this process are RefIdxSymL0 and RefIdxSymL0 specifying the list 0 and list 1 reference picture indices for symmetric motion vector differences, i.e., when sym_mvd_flag is equal to 1 for a coding unit.
The variable RefIdxSymLX with X being 0 and 1 is derived as follows:
Step #1: First Loop Each Reference Picture List
The variable currPic specifies the current picture.
RefIdxSymL0 is set equal to −1.
For each index i with i=0 . . . NumRefIdxActive[ 0], the following applies:
When all of the following conditions are true, RefIdxSymL0 is set to i:
DiffPicOrderCnt(currPic, RefPicList[0][i])>0,
DiffPicOrderCnt(currPic, RefPicList[0][i])<DiffPicOrderCnt(currPic, RefPicList[0][RefIdxSymL0]) or RefIdxSymL0 is equal to −1.
RefIdxSymL1 is set equal to −1.
For each index i with i=0 . . . NumRefIdxActive[1], the following applies:
When all of the following conditions are true, RefIdxSymL1 is set to i:
DiffPicOrderCnt(currPic, RefPicList[1][i])<0,
DiffPicOrderCnt(currPic, RefPicList[1][i])>DiffPicOrderCnt(currPic, RefPicList[1][RefIdxSymL1]) or RefIdxSymL1 is equal to −1.
Step #2: second Loop Each Reference Picture List
When RefIdxSymL1 is equal to −1 or RefIdxSymL1 is equal to −1, the following applies:
For each index i with i=0 . . . NumRefIdxActive[0], the following applies:
When all of the following conditions are true, RefIdxSymL0 is set to i:
DiffPicOrderCnt(currPic, RefPicList[0][i])<0,
DiffPicOrderCnt(currPic, RefPicList[0][i])>DiffPicOrderCnt(currPic, RefPicList[0][RefIdxSymL0]) or RefIdxSymL0 is equal to −1.
For each index i with i =0 . . . NumRefIdxActive[1], the following applies:
When all of the following conditions are true, RefIdxSymL1 is set to i:
DiffPicOrderCnt(currPic, RefPicList[1][i])>0,
DiffPicOrderCnt(currPic, RefPicList[1][i])<DiffPicOrderCnt(currPic, RefPicList[1][RefIdxSymL1]) or RefIdxSymL1 is equal to −1.

Secondly, in CU level, a symmetrical mode flag indicating whether symmetrical mode is used or not is explicitly signaled if the prediction direction for the CU is bi-prediction and BiDirPredFlag is equal to 1.
When the flag is true, only mvp_l0_flag, mvp_l1_flag and MVD0 are explicitly signaled. The reference indices are set equal to RefIdxSymL0, RefIdxSymL1 for list 0 and list 1, respectively. MVD1 is just set equal to −MVD0. The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

FIG. 13 is an example illustration for symmetrical mode. Related syntax is as follows.

| | Descriptor |
|---|---|
| coding_unit( x0, y0, cb Width, cbHeight, treeType ) { | |
|   if( slice_type != I \| \| sps_ibc_enabled_flag ) { | |
|     if( treeType != DUAL_TREE_CHROMA ) | |
|       cu_skip_flag[ x0 ][ y0 ] | ae(v) |

-continued

| | Descriptor |
|---|---|
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = = 0 ) \|\| | |
|       ( slice_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
| ... | |
|   } else if( treeType != DUAL_TREE_CHROMA ) { /* MODE_INTER or MODE_IBC */ | |
|     if( cu_skip_flag[ x0 ][ y0 ] = = 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else if ( CuPredMode[ x0 ][ y0 ] = = MODE_IBC ) { | |
|       mvd_coding( x0, y0, 0, 0 ) | |
|       mvp_l0_flag[ x0 ][ y0 ] | ae(v) |
|       if( sps_amvr_enabled_flag && | |
|       ( MvdL0[ x0 ][ y0 ][ 0 ] != 0 \|\| MvdL0[ x0 ][ y0 ][ 1 ] != 0 ) ) { | |
|         amvr_precision_flag[ x0 ][ y0 ] | ae(v) |
|       } | |
|     } else { | |
|       if( slice_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( inter_pred_idc[ x0 ][ y0 ] = = PRED_BI && !inter_affine_flag[ x0 ][ y0 ] && | |
|         RefIdxSymL0 > -1 && RefIdxSymL1 > -1 ) | |
|         ***sym_mvd_flag*[*x0* ][*y0* ]** | ae(v) |
|       if( inter_pred_idc[ x0 ][ y0 ] != PRED_L1 ) { | |
|         if( NumRefIdxActive[ 0 ] > 1 && !sym_mvd_flag[ x0 ][ y0 ] ) | |
|           ref_idx_l0[ x0 ][ y0 ] | ae(v) |
|         mvd_coding( x0, y0, 0, 0 ) | |
|         if( MotionModelIdc[ x0 ][ y0 ] > 0 ) | |
|           mvd_coding( x0, y0, 0, 1) | |
|         if(MotionModelIdc[ x0 ][ y0 ] > 1) | |
|         mvd_coding(x0, y0, 0, 2) | |
|         mvp_l0_flag[ x0 ][ y0 ] | ae(v) |
|       } else { | |
|         MvdL0[ x0 ][ y0 ][ 0 ] = 0 | |
|         MvdL0[ x0 ][ y0 ][ 1 ] = 0 | |
|       } | |
|       if( inter_pred_idc[ x0 ][ y0 ] != PRED_L0 ) { | |
|         if(NumRefIdxActive[ 1 ] > 1 && !sym_mvd_flag[ x0 ][ y0 ] ) | |
|           ref_idx_l1[ x0 ][ y0 ] | ae(v) |
|         if( mvd_l1_zero_flag && inter_pred_idc[ x0 ][ y0 ] = = PRED_BI ) { | |
|           MvdL1[ x0 ][ y0 ][ 0 ] = 0 | |
|           MvdL1[ x0 ][ y0 ][ 1 ] = 0 | |
|           MvdCpL1[ x0 ][ y0 ][ 0 ][ 0 ] = 0 | |
|           MvdCpL1[ x0 ][ y0 ][ 0 ][ 1 ] = 0 | |
|           MvdCpL1[ x0 ][ y0 ][ 1 ][ 0 ] = 0 | |
|           MvdCpL1[ x0 ][ y0 ][ 1 ][ 1 ] = 0 | |
|           MvdCpL1[ x0 ][ y0 ][ 2 ][ 0 ] = 0 | |
|           MvdCpL1[ x0 ][ y0 ][ 2 ][ 1 ] = 0 | |
|         } else { | |
|           ***if( sym_mvd_flag*[*x0* ][*y0* ])** { | |
|             ***MvdL1*[*x0* ][*y0* ][*0* ]= −*MvdL0*[*x0* ][*y0* ][*0* ]** | |
|             ***MvdL1*[*x0* ][*y0* ][*1* ]= −*MvdL0*[*x0* ][*y0* ][*1* ]** | |
|           } *else* | |
|             mvd_coding(x0, y0, 1, 0) | |
|           if( MotionModelIdc[ x0 ][ y0 ] > 0 ) | |
|             mvd_coding( x0, y0, 1,1) |

-continued

| | Descriptor |
|---|---|
| ``` 
        if(MotionModelIdc[ x0 ][ y0 ] > 1 )
          mvd_coding(x0,y0,1,2)
        mvp_l1_flag[ x0 ][ y0 ]
      }
    } else {
      MvdL1[ x0 ][ y0 ][ 0 ] = 0
      MvdL1[ x0 ][ y0 ][ 1 ] = 0
    }
...
    }
  }
}
``` | mvp_l1_flag  ae(v) |

2.2.4 MVD Semantics

7.4.8.8 Motion Vector Difference Semantics abs_mvd_greater0_flag[compIdx] specifies whether the absolute value of a motion vector component difference is greater than 0.

abs_mvd_greater1_flag[compIdx] specifies whether the absolute value of a motion vector component difference is greater than 1.

When abs_mvd_greater1_flag[compIdx] is not present, it is inferred to be equal to 0.

abs_mvd_minus2[compIdx] plus 2 specifies the absolute value of a motion vector component difference.

When absmvdminus2[compIdx] is not present, it is inferred to be equal to −1.

mvd_sign_flag[compIdx] specifies the sign of a motion vector component difference as follows:

If mvd_sign_flag[compIdx] is equal to 0, the corresponding motion vector component difference has a positive value.

Otherwise (mvd_sign_flag[compIdx] is equal to 1), the corresponding motion vector component difference has a negative value.

When mvd_sign_flag[compIdx] is not present, it is inferred to be equal to 0.

The motion vector difference lMvd[compIdx] for compIdx=0 . . . 1 is derived as follows:

$$lMvd[compIdx]=abs\_mvd\_greater0\_flag[compIdx]* (abs\_mvd\_minus2[compIdx]+2)*(1- 2*mvd\_sign\_flag[compIdx]) \quad (7\ 126)$$

The value of lMvd[compIdx] shall be in the range of −215 to 215−1, inclusive.

Depending in the value of MotionModelIdc[x0][y0], motion vector differences are derived as follows:

If MotionModelIdc[x0][y0] is equal to 0, the variable MvdLX[x0][y0][compIdx], with X being 0 or 1, specifies the difference between a list X vector component to be used and its prediction. The array indices x0, y0 specify the location (x0, y0) of the top-left luma sample of the considered coding block relative to the top-left luma sample of the picture. The horizontal motion vector component difference is assigned compIdx=0 and the vertical motion vector component is assigned compIdx=1.

If refList is equal to 0, MvdL0[x0][y0][compIdx] is set equal to lMvd[compIdx] for compIdx=0 . . . 1.

Otherwise (refList is equal to 1), MvdL1[x0][y0][compIdx] is set equal to lMvd[compIdx] for compIdx=0 . . . 1.

Otherwise (MotionModelIdc[x0][y0] is not equal to 0), the variable MvdCpLX[x0][y0][cpIdx][compIdx], with X being 0 or 1, specifies the difference between a list X vector component to be used and its prediction. The array indices x0, y0 specify the location (x0, y0) of the top-left luma sample of the considered coding block relative to the top-left luma sample of the picture, the array index cpIdx specifies the control point index. The horizontal motion vector component difference is assigned compIdx=0 and the vertical motion vector component is assigned compIdx=1.

If refList is equal to 0, MvdCpL0[x0][y0][cpIdx][compIdx] is set equal to lMvd[compIdx] for compIdx= 0 . . . 1.

Otherwise (refList is equal to 1), MvdCpL1[x0][y0][cpIdx][compIdx] is set equal to lMvd[compIdx] for compIdx=0 . . . 1.

3. Examples of Problems Solved by Disclosed Embodiments

The current SMVD may have the following problems:

1. SMVD is disallowed when mvd_l1_zero_flag is true, which may be inefficient.
2. In current SMVD mode, MVD of reference picture list 0 is always signaled, which doesn't consider the bitrate cost of the side information.
3. The target reference picture index of list 0 and 1 used in SMVD mode are derived in the slice level with two steps:
   a. Find the closest reference picture from all forward reference pictures in list 0 and the closest reference picture from all backward reference pictures in list 1;
   b. If one of them is not found, search in the opposite direction.

It is noted that for the following cases, the second step (i.e., step b) needs to be invoked for all of the following cases:

1) list 1 only has forward reference pictures, and list 0 only have backward reference pictures;
  2) both list 0 and list 1 only have forward reference pictures;
  3) both list 0 and list 1 only have backward reference pictures;
  4) list X has both forward and backward reference pictures, but list Y (Y=1−X) only have reference pictures which are not the same as those mentioned in bullet a.

For cases 2) and 3), enabling SMVD is not reasonable since there is no symmetric motion among two references in the same direction (forward or backward).

4. In addition, with the searching method, it is possible to find the reference pictures not closest to the current picture which may limit the coding performance of SMVD. The current design has the restriction of finding forward from list 0 and backward from list 1; and vice versa. For example, if list 0 and list 1 have both forward and backward reference pictures, but the closest reference picture in list 0 is from backward, and the closet in list 1 is from forward. With current design, there is no chance to select the closest one from backward in list 0.
5. When list 0 have both forward and backward reference pictures and list 1 only have forward reference pictures, with current design, it will identify two forward reference pictures, which is conflict with the concept of the SMVD design.
6. Two loops for each reference picture list may be invoked to find the target reference pictures which may increase the complexity.
4. DMVR is disabled in SMVD mode though symmetric MVD is assumed in both DMVR and SMVD
5. It is possible that all MVDs are zeros in SMVD mode which may be similar to the case of normal AMVR mode.
6. MVD for list 1 is derived from the signaled MVD for list 0, i.e., opposite of both horizontal and vertical component of the MVD for list 0. Such assumption is that the two reference pictures are with same distance to the current picture. However, it is not always true.
7. VVC defines a range of MVD that MVD should be within $[-2^{15}, 2^{15}-1]$. In SMVD, MVD for list 1 is derived from the signaled MVD for list 0 may exceed the constrains on MVD.

4. Example Embodiments

The listing below should be considered as examples to explain general concepts. These embodiments should not be interpreted in a narrow way. Furthermore, these embodiments can be combined in any manner.

In this disclosure, decoder side motion vector derivation (DMVD) includes methods like DMVR and Frame Rate Up-Conversion (FRUC) which perform motion estimation to derive or refine the block/sub-block motion information, and BIO which performs sample-wise motion refinement.

The unequal weights applied to prediction blocks may refer to that used in the GBI process, LIC process, weighted prediction process or other encoding/decoding process of a coding tool that need to apply additional operations to prediction blocks instead of average of two prediction blocks, etc.

Suppose the reference picture in list 0 and list 1 are Ref0 and Ref1, respectively, the POC distance between the current picture and Ref0 is PocDist0 (e.g., absolute value of (POC of current picture minus POC of Ref0)), and the POC distance between Ref1 and the current picture is PocDist1 (e.g., absolute value of (POC of Ref1 minus POC of current picture)). Denote width and height of the block as W and H respectively. Suppose function abs(x) returns the absolute value of x.

All-zero MVD represents the case that all MVDs (including both x and y components) to be signaled are equal to zero.

For the SMVD mode, the two target reference pictures are denoted by RefIdxL0 and RefIdxL1, respectively. Two variables, currPocDiffL0 and currPocDiffL1 are defined to denote the POC distances between reference pictures and current picture. For example, currPocDiffL0=POC(current picture)−POC(RefIdxL0), currPocDiffL1=POC(current picture)−POC(RefIdxL1), Abs(x)=x>0?x:−x.

1. SMVD may be allowed even when MVD in list X (X=0, 1) is indicated to be forced to zero (e.g., when mvd_l1_zero_flag is equal to 1).
   a. In one example, when MVD coding for list 1 is not coded and forced to be zero (e.g., mvd_l1_zero_flag is equal to 1), the SMVD mode may still be enabled for a block.
      i. In one example, furthermore, the MVD for reference picture list 1 is not forced to be zero (e.g., mvd_l1_zero_flag is equal to 1), but it could be derived from the associated MVD for reference picture list 0.
   b. In one example, in SMVD mode, MVD may not be signaled for list X and may be signaled for list Y = 1−X, and the signaled MVD in list Y may be used for deriving (e.g., mirrored) the MVD in list X.
      i. For example, X may be equal to 0.
   c. Alternatively, SMVD may be disallowed when MVD in list X is indicated to be forced to zero.
      i. When SMVD is disallowed, all related syntax elements for SMVD may not be signaled. For example, they may be implicitly derived.
2. It is proposed to code the MVD information of reference picture list 1 in the SMVD mode. In this case, the MVD of reference picture list 0 is derived from that of reference picture list 1.
   a. In one example, the reference list with associated MVD to be signaled (or to be derived) may be also signaled in the bitstream.
      i. In one example, indication of the reference picture list that the associated MVD need to be signaled may be signaled in the sequence/picture/slice/tile/video unit-level, such as SPS/picture parameter set (PPS)/slice header.
   b. In one example, the reference list with associated MVD to be signaled (or to be derived) may be derived according to reference pictures in the reference picture lists.
      i. In one example, the reference list with associated MVD to be signaled (or to be derived) may be derived according to the target two reference pictures.
         1. Alternatively, furthermore, if Abs(currPocDiffL0) is greater than Abs(currPocDiffL1), MVD for list 0 may be signaled. Otherwise, MVD for list 1 may be signaled.
         2. Alternatively, furthermore, if Abs(currPocDiffL0) is greater than Abs(currPocDiffL1), MVD for list 1 may be signaled. Otherwise, MVD for list 0 may be signaled.
         3. Alternatively, furthermore, if Abs(currPocDiffL0) is greater than or equal to Abs(currPocDiffL1), MVD for list 0 may be signaled. Otherwise, MVD for list 1 may be signaled.
         4. Alternatively, furthermore, if Abs(currPocDiffL0) is greater than or equal to Abs(currPocDiffL1), MVD for list 1 may be signaled. Otherwise, MVD for list 0 may be signaled.
         5. Alternatively, furthermore, if Abs(currPocDiffL0) is equal to Abs(currPocDiffL1), MVD for list 0 may be signaled. Otherwise, MVD for list 1 may be signaled.

6. Alternatively, furthermore, if Abs(currPocDiffL0) is equal to Abs(currPocDiffL1), MVD for list 1 may be signaled. Otherwise, MVD for list 0 may be signaled.
     c. In one example, the reference list with associated MVD to be signaled (or to be derived) may be also changed from one video unit (e.g., slice/tile group/tile/brick/CU) to another one.
        i. In one example, the selection of reference list with associated MVD to be signaled may depend on the reference pictures information of neighboring blocks.
        ii. In one example, the reference picture list with the smaller absolute POC distances between PocDist0 and PocDist1 (wherein the two reference pictures are the two utilized in SMVD) is chosen.
           1. In one example, if PocDist0 is smaller than PocDist1, MVD of list 0 is signaled, and MVD of list 1 is derived.
           2. Alternatively, the reference picture list with the larger absolute POC distances between PocDist0 and PocDist1 (wherein the two reference pictures are the two utilized in SMVD) is chosen.
           3. If PocDist0 and PocDist1 is equal, list X (X being 0 or 1) may be chosen.
3. It is proposed to allow SMVD with both target reference pictures from the same reference picture list.
     a. In one example, one of the two target reference pictures is forward (i.e., its POC is smaller than current POC) and the other is backward (i.e., its POC is larger than the current POC).
     b. In one example, all reference pictures in list 0 and list 1 may be checked in order to find a first reference picture whose POC is closest to the current POC among all the POCs of reference pictures which are smaller than the current POC, and a second reference picture whose POC is closest to the current POC among all the POCs of reference pictures which are bigger than the current POC.
4. It is proposed to skip the second step in the derivation of target reference pictures for the SMVD mode when at least one of the target reference pictures is found from the first step.
     a. In one example, if one reference picture is found in list 0 and no reference picture found in list 1, the second step in the derivation of target reference pictures for the SMVD mode is skipped.
     b. In one example, if no reference picture is found in list 0 and one reference picture found in list 1, the second step in the derivation of target reference pictures for the SMVD mode is skipped.
     c. Alternatively, furthermore, SMVD is disabled. That is, the signaling of all SMVD related syntaxes are skipped.
5. It is proposed to decouple the output of the first step (e.g., step #1 in section 2.2.3) and the second step (e.g., step #1 in section 2.2.3). Only three cases are supported: both target reference picture indices could be found in either the first (searching forward in list 0 for the target reference picture in list 0, and searching backward in list 1 for the target reference picture in list 1) or second step (searching backward in list 0 for the target reference picture in list 0, and searching forward in list 1 for the target reference picture in list 1); or (not all are found in the first step, or in the second step) SMVD is disabled.
     a. In one example, before invoking the second step in the derivation of target reference pictures for the SMVD mode when at least one of the target reference pictures is not found, the target reference picture indices are reset to be unavailable (e.g., resetting RefIdxSymL0 and RefIdxSymL1 to −1).
6. It is proposed to add a constraint that the found two target reference pictures, if available, shall be one with smaller POC value and one with greater POC value compared to current picture.
     a. In one example, additional check of POC distances is added after the target reference picture derivation process and the target reference pictures may be reset to be unavailable (e.g., resetting RefIdxSymL0 and RefIdxSymL1 to −1).
     b. In one example, when (RefIdxSymL1!=−1 && RefIdxSymL0!=−1 && DiffPicOrderCnt(currPic, RefPicList[0][RefIdxSymL1])*DiffPicOrderCnt(currPic, RefPicList[1][RefIdxSymL1])>0) is true, the target reference pictures may be reset to be unavailable.
7. It is proposed to remove the restriction of finding forward reference picture (its POC is smaller than the current POC) from list 0 and backward reference picture (its POC is larger than the current POC) from list 1, and vice versa.
     a. In one example, the target reference pictures used in SMVD may be derived with two dependent checks (one loop for each reference picture list).
        i. The first check is to find one reference picture in list X (X being 0 or 1).
        ii. The second check to find one reference picture in list Y according to the output of the first check and reference pictures in list Y (Y being 1−X).
     b. In one example, firstly, for list X (X being 0 or 1), POC distances between each reference pictures and the current picture are calculated regardless it is forward or backward according to a given order.
        i. In one example, the given order is the ascending/descending order of reference picture index.
        ii. In one example, the reference picture which has the smallest (or greatest) POC distance (e.g., Abs(POC(reference picture)−POC(current picture)) is selected as the target reference picture for list X, denoted by RefInLX.
        iii. Alternatively, furthermore, selecting one reference picture from list Y (Y being 1−X) according to the reference picture RefInLX.
           1. In one example, if RefInLX has a smaller POC value compared to the current picture, the target reference picture for list Y shall be with greater POC value compared to current picture.
           2. In one example, if RefInLX has a greater POC value compared to the current picture, the target reference picture for list Y shall be with smaller POC value compared to current picture.
           3. In one example, the target reference picture for list Y shall be the one with the smallest POC distance compared to current picture among all backward (if RefInLX is forward) or forward reference pictures (if RefInLX is backward) in list Y.
8. Whether SMVD is allowed or not may depend on the coding information of the block.
     a. In one example, the coding information may include MVD precision information, weights of the prediction samples in bi-prediction.

b. In one example, SMVD may be disallowed when unequal weights are selected for the bi-predicted blocks.
   i. Alternatively, unequal weights mode may be disallowed in SMVD mode.
   ii. When SMVD is disallowed, all related syntax elements to SMVD may be not signaled and/or implicitly derived.
   iii. When unequal weights is disallowed, all related syntax elements related to unequal weights may be not signaled and/or implicitly derived.
   iv.
c. In one example, SMVD may be disallowed for certain MVD/MV precision.
   i. For example, SMVD may be disallowed for N-pel MV/MVD precision, e.g., N=1, 4.
   ii. Alternatively, AMVR may be disallowed in SMVD mode. For example, only N-pel MV/MVD precision may be allowed in SMVD mode, e.g., N=¼.
   iii. When SMVD is disallowed, all syntax elements related to SMVD may be not signaled and implicitly derived.
   iv. When AMVR is disallowed, all syntax elements related to AMVR may be not signaled and implicitly derived.

9. DMVR or/and other DMVD methods may be enabled in SMVD mode.
   a. In one example, in SMVD mode, if the MV/MVD precision is N-pel, DMVR or/and other DMVD methods may be used to refine the MVD by mvdDmvr. mvdDmvr is with M-pel precision. N, M=1/16, 1/8, 1/4, 1/2, 1, 2, 4, 8, 16 etc.
   b. In one example, M may be smaller than or equal to N.
   c. In one example, MVD may be not signaled in SMVD mode, instead, DMVR or/and other DMVD methods may be applied to generate the MVD.
      i. Alternatively, furthermore, AMVR information may be not signaled, and the MV/MVD precision may be derived to be with a predefined value (e.g., MVD is with ¼-pel precision).
   d. In one example, indication of whether DMVR or/and other DMVD methods are applied or not may be signaled in SMVD mode.
      i. If DMVR or/and other DMVD methods are applied, MVD may be not signaled.
      ii. In one example, such indication may be signaled for certain MV/MVD precisions. For example, such indication may be signaled for 1-pel or/and 4-pel MV/MVD precisions.
      iii. In one example, such indication may be signaled only when PocDist0 is equal to PocDist 1 and Ref0 is a preceding picture and Ref1 is a following picture of the current picture in display order.
      iv. In one example, such indication may be signaled only when PocDist0 is equal to PocDist 1 and Ref0 is a following picture and Ref1 is a preceding picture of the current picture in display order.

10. Whether all-zero MVD is allowed or not may depend on the coding information of the block. For example, the coding information may include SMVD mode information, motion information of the block.
    a. In one example, all-zero MVD may be disallowed in SMVD mode.
       i. For example, if horizontal MVD is zero in SMVD mode, instead of directly encoding vertical MVD, vertical MVD may be decreased by 1 (e.g., if vertical MVD is positive) or increased by 1 (e.g., if vertical MVD is negative) before encoding and may be increased by 1 (if vertical MVD is positive) or decreased by 1 (if vertical MVD is negative) after decoding.
       ii. For example, if vertical MVD is zero in SMVD mode, instead of directly encoding horizontal MVD, horizontal MVD may be decreased by 1 (e.g., if horizontal MVD is positive) or increased by 1 (e.g., if horizontal MVD is negative) before encoding and may be increased by 1 (if horizontal MVD is positive) or decreased by 1 (if horizontal MVD is negative) after decoding.
    b. In one example, all-zero MVD may be disallowed in non-SMVD mode.
       i. For example, in non-SMVD mode, if the reference pictures of the block are the same as the derived reference pictures used by SMVD mode block, then all-zero MVD may be disallowed.
          1. For example, suppose there are K MVD components in total in non-SMVD mode, if the first K-1 MVD components are zero. Then, instead of directly encoding the Kth MVD component, it may be decreased by 1 (e.g., if it is positive) or increased by 1 (e.g., if it is negative) before encoding and may be increased by 1 (e.g., if it is positive) or decreased by 1 (e.g., if it is negative) after decoding.

11. Instead of trying to find the closest reference pictures (either forward or backward), it is proposed to give a higher priority to find two target reference pictures with the equal distance to the current picture.
    a. Suppose there are N pairs of reference pictures in list 0 and list 1, denoted by (RefL0$_i$, RefL1$_i$) with i being [0, N-1], one of the N pairs may be selected as the target two reference pictures used in SMVD.
       i. Alternatively, furthermore, for a pair, one reference picture is from list 0 and the other from list 1.
       ii. Alternatively, furthermore, for a pair, one reference picture is a forward reference picture from list 0 and the other is a backward reference picture from list 1.
       iii. Alternatively, furthermore, for a pair, one reference picture is a backward reference picture from list 0 and the other is a forward reference picture from list 1.
       iv. Alternatively, furthermore, for a pair, one reference picture is a backward reference picture and the other is a forward reference picture, with both from the same reference picture list.
    b. Suppose there are N pairs of reference pictures in list 0 and list 1, denoted by (RefL0$_i$, RefL1$_i$) with i being [0, N-1], one of the N pairs with the smallest or largest absolute POC distances with current picture may be selected as the target two reference pictures used in SMVD.
    c. When there are no such pairs in the reference picture lists, target reference pictures may be selected according to the POC distances to the current picture, such as using current way, or the above methods.

12. It is proposed to disable SMVD when the two target reference pictures are with unequal distance to the current picture (i.e., currPocDiffL0!=currPocDiffL1).

a. Alternatively, furthermore, the signaling of SMVD related syntax elements (such as sym_mvd_flag) may be skipped and SMVD is inferred not be used.
13. A coding method which derives the MVD of reference picture list X from the signaled MVD of reference picture list Y (with Y being 1-X) according to POC values of two reference pictures and current picture. Suppose the signaled MVD for reference picture list Y is MvdLY with its horizontal and vertical component denoted by MvdLY[0] and MvdLY[1], the MVD for reference picture list X denoted by (MvdLX[0], MvdLX[1]) may be derived by the following method:
   a. In one example, MvdLX[0]=MvdLY[0]*(POC(targetRef in List X)−POC(current picture))/(POC(targetRef in List Y)−POC(current picture)).
   b. In one example, MvdLX[1]=MvdLY[1]*(POC(targetRef in List X)−POC(current picture))/(POC(targetRef in List Y)−POC(current picture)).
   c. In one example, the above methods may be applied to the SMVD mode wherein instead of always using the opposite MVD of list 0 as the MVD for list 1, it is proposed to scale the MVD of list 0 according to POC distances when deriving the MVD of list 1.
   d. Similarly, in SMVD, if MVD is signaled for list 1, it is proposed to scale the MVD of list 1 according to POC distances when deriving the MVD of list 0.
   e. Alternatively, the above methods may be applicable the symmetric MV coding mode wherein the information of MV of one reference picture list may not be signaled but derived from the other reference picture list via scaling.
14. When MVD of one reference picture list is derived from the other one associated with the other reference picture list, a restriction on the range of derived MVD shall be satisfied.
   a. In one example, the x component and/or the y component of the second MVD derived from the first MVD with the SMVD method should be in a predefined range.
   b. In one example, the x component and/or the y component of the second MVD should be clipped or conditionally modified according to a predefined range.
      i. For example, Mz is clipped as Mz=Clip3($-2^N$, $2^N-1$, Mz), where Mz represents the x component or the y component of the second MVD. N is an integer such as 16 or 18.
         1. For example, N may be 15 or 17.
      ii. For example, Mz is clipped as Mz=Clip3($-2^{N+1}$, $2^N-1$, Mz), where Mz represents the x component or the y component of the second MVD. N is an integer such as 16 or 18.
         1. For example, N may be 15 or 17.
      iii. For example, Mz is modified as Mz=$2^N-1$ if Mz=$2^N$, where Mz represents the x component or the y component of the second MVD. N is an integer such as 16 or 18.
         1. For example, N may be 15 or 17.
   c. In one example, the x component and/or the y component of the second MVD should be within a predefine range in a conformance bitstream.
      i. In one example, the x component and/or the y component of the second MVD should be within the range of [$-2^N$, $2^N-1$] inclusively in a conformance bitstream. N is an integer such as 16 or 18.
         1. For example, N may be 15 or 17.
      ii. In one example, the x component and/or the y component of the second MVD should be within the range of [$-2^N+1$, $2^N-1$] inclusively in a conformance bitstream. N is an integer such as 16 or 18.
         1. For example, N may be 15 or 17.
   d. In one example, the x component and/or the y component of the first MVD should be clipped or conditionally modified according to a first predefined range so that the x component and/or the y component of the second MVD derived from the first MVD with the SMVD method can be in a second predefined range.
      i. For example, Mz is clipped as Mz=Clip3($-2^{N+1}$, $2^N-1$, Mz), where Mz represents the x component or the y component of the first MVD. N is an integer such as 16 or 18.
         1. For example, N may be 15 or 17.
      ii. For example, Mz is modified as Mz=$-2^N+1$ if Mz=$-2^N$, where Mz represents the x component or the y component of the first MVD. N is an integer such as 16 or 18.
         1. For example, N may be 15 or 17.
   e. In one example, the x component and/or the y component of the first MVD should be within a first predefine range in a conformance bitstream so that the x component and/or the y component of the second MVD derived from the first MVD with the SMVD method can be in a second predefined range.
      i. In one example, the first predefine range may be different to the predefine range fir the signaled MVD when SMVD is not applied.
      ii. In one example, the x component and/or the y component of the first MVD should be within the range of [$-2^N+1$, $2^N-1$] inclusively in a conformance bitstream. N is an integer such as 16 or 18.
         1. For example, N may be 15 or 17.
   f. Alternatively, instead of restricting the signaled MVD to be within [$-2^N$, $2^N-1$], it is proposed to restrict it to be within [$-2^N+1$, $2^N-1$].
      i. In one example, the MVD range for SMVD (or other tools that derives MVD from another reference picture list) may be set differently from those MVDs for non-SMVD coding tools.
         1. For example, the signaled MVD to be within [$-2^N$+FSMVDFlag, $2^N-1$], wherein SMVDFlag is equal to 1 SMVD is applied and SMVDFlag is equal to 0 if SMVD is not applied.
   g. In one example, the clipping or constraint on MVD (such as in VVC or disclosed above) may be performed before the MVD is modified according to the MV resolution.
      i. Alternatively, the clipping or constraint on MVD (such as in VVC or disclosed above) may be performed after the MVD is modified according to the MV resolution.
   h. In one example, the clipping or constraint on MVD (such as in VVC or disclosed above) may depend on the MV resolution.

5. Embodiments

The changes on top of VVC working draft version 5 are highlighted in bold face italics. Deleted texts are marked with ~~strikethrough~~ .

5.1 Embodiment #1 on Usage of SMVD When mvd_l1_zero_flag is true

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type == I && cu_skip_flag[ x0 ][ y0 ] = = 0 ) \|\| | |
|       ( slice_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY \|\| cbHeight <= MaxTbSize Y ) && | |
|           ( cbWidth * cbHeight > MinTbSize Y * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType == SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     if( cu_skip_flag[ x0 ][ y0 ] = = 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else if ( CuPredMode[ x0 ][ y0 ] = = MODE_IBC ) { | |
|       mvd_coding(x0, y0, 0, 0) | |
|       mvp_l0_flag[ x0 ][ y0 ] | ae(v) |
|       if( sps_amvr_enabled_flag && | |
|         ( MvdL0[ x0 ][ y0 ][ 0 ] != 0 \|\| MvdL0[ x0 ][ y0 ][ 1 ] != 0 ) ) { | |
|         amvr_precision_flag[ x0 ][ y0 ] | ae(v) |
|       } | |
|     } else { | |
|       if( slice_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |

-continued

|  | Descriptor |
|---|---|
| if( inter_pred_idc[ x0 ][ y0 ] = = PRED_BI | |
| && !inter_affine_flag[ x0 ][ y0 ] && | |
|     RefIdxSymL0 > −1 && RefIdxSymL1 > −1 ) | |
|   sym_mvd_flag[ x0 ][ y0 ] | ae(v) |
| if( inter_pred_idc[ x0 ][ y0 ] != PRED_L1 ) { | |
|   if( NumRefIdxActive[ 0 ] > 1 | |
| && !sym_mvd_flag[ x0 ][ y0 ] ) | |
|     ref_idx_l0[ x0 ][ y0 ] | ae(v) |
|   mvd_coding( x0, y0, 0, 0) | |
|   if( MotionModelIdc[ x0 ][ y0 ] > 0 ) | |
|     mvd_coding( x0, y0, 0, 1) | |
|   if(MotionModelIdc[ x0 ][ y0 ] > 1 ) | |
|     mvd_coding(x0, y0, 0, 2 ) | |
|   mvp_l0_flag[ x0 ][ y0 ] | ae(v) |
| } else { | |
|   MvdL0[ x0 ][ y0 ][ 0 ] = 0 | |
|   MvdL0[ x0 ][ y0 ][ 1 ] = 0 | |
| } | |
| if( inter_pred_idc[ x0 ][ y0 ] != PRED_L0 ) { | |
|   if( NumRefIdxActive[ 1 ] > 1 | |
| && !sym_mvd_flag[ x0 ][ y0 ] ) | |
|     ref_idx_l1[ x0 ][ y0 ] | ae(v) |
|   if( mvd_l1_zero_flag && !sym_mvd_flag[x0 ][y0 ] && | |
| inter_pred_idc[ x0 ][ y0 ] | |
|     = = PRED_BI ) { | |
|     MvdL1[ x0 ][ y0 ][ 0 ] = 0 | |
|     MvdL1[ x0 ][ y0 ][ 1 ] = 0 | |
|     MvdCpL1[ x0 ][ y0 ][ 0 ][ 0 ] = 0 | |
|     MvdCpL1[ x0 ][ y0 ][ 0 ][ 1 ] = 0 | |
|     MvdCpL1[ x0 ][ y0 ][ 1 ][ 0 ] = 0 | |
|     MvdCpL1[ x0 ][ y0 ][ 1 ][ 1 ] = 0 | |
|     MvdCpL1[ x0 ][ y0 ][ 2 ][ 0 ] = 0 | |
|     MvdCpL1[ x0 ][ y0 ][ 2 ][ 1 ] = 0 | |
|   } else { | |
|     if( sym_mvd_flag[ x0 ][ y0 ] ) { | |
|       MvdL1[ x0 ][ y0 ][ 0 ] = −MvdL0[ x0 ][ y0 ][ 0 ] | |
|       MvdL1[ x0 ][ y0 ][ 1 ] = −MvdL0[ x0 ][ y0 ][ 1 ] | |
|     } else | |
|       mvd_coding(x0, y0, 1, 0 ) | |
|     if(MotionModelIdc[ x0 ][ y0 ] > 0 ) | |
|       mvd_coding( x0, y0, 1, 1 ) | |
|     if(MotionModelIdc[ x0 ][ y0 ] > 1 ) | |
|       mvd_coding(x0, y0, 1, 2 ) | |
|     mvp_l1_flag[ x0 ][ y0 ] | ae(v) |
|   } | |
| } else { | |
|   MvdL1[ x0 ][ y0 ][ 0 ] = 0 | |
|   MvdL1 [ x0 ][ y0 ][ 1 ] = 0 | |
| } | |
| if( ( sps_amvr_enabled_flag && inter_affine_flag = = 0 && | |
|   ( MvdL0[ x0 ][ y0 ][ 0 ] != 0 \| \| MvdL0[ x0 ][ y0 ][ 1 ] != 0 \| \| | |
|   MvdL1[ x0 ][ y0 ][ 0 ] != 0 \| \| MvdL1[ x0 ][ y0 ][ 1 ] != 0 ) ) \| \| | |
|   ( sps_affine_amvr_enabled_flag && | |
| inter_affine_flag[ x0 ][ y0 ] = = 1 && | |
|   ( MvdCpL0[ x0 ][ y0 ][ 0 ][ 0 ] != 0 \| \| | |
| MvdCpL0[ x0 ][ y0 ][ 0 ][1] != 0 \| \| | |
|   MvdCpL1[ x0 ][ y0 ][ 0 ] [ 0 ] != 0 \| \| | |
| MvdCpL1 [ x0 ][ y0 ][ 0 ][1] != 0 \| \| | |
|   MvdCpL0[ x0 ][ y0 ][ 1 ] [0] != 0 \| \| | |
| MvdCpL0[ x0 ][ y0 ][ 1 ][1] != 0 \| \| | |
|   MvdCpL1[ x0 ][ y0 ][ 1 ] [0] != 0 \| \| | |
| MvdCpL1[ x0 ][ y0 ][ 1 ][1] != 0 \| \| | |
|   MvdCpL0[ x0 ][ y0 ][ 2 ] [0] != 0 \| \| | |
| MvdCpL0[ x0 ][ y0 ][ 2 ][1] != 0 \| \| | |
|   MvdCpL1 [ x0 ][ y0 ][ 2 ] [ 1 ] != 0 ) ) { | |
|   amvr_flag[ x0 ][ y0 ] | ae(v) |
|   if( amvr_flag[ x0 ][ y0 ] ) | |
|     amvr_precision_flag[ x0 ][ y0 ] | ae(v) |
| } | |

|  | Descriptor |
|---|---|
| ``` 
        if( sps_gbi_enabled_flag && inter_pred_idc[ x0 ][ y0 ] = =
PRED_BI &&
            luma_weight_l0_flag[ ref_idx_l0 [ x0 ][ y0 ] ] = = 0 &&
            luma_weight_l1_flag[ ref_idx_l1 [ x0 ][ y0 ] ] = = 0 &&
            chroma_weight_l0_flag[ ref_idx_l0 [ x0 ][ y0 ] ] = = 0 &&
            chroma_weight_l1_flag[ ref_idx_l1 [ x0 ][ y0 ] ] = = 0 &&
            cbWidth * cbHeight >= 256 )
            gbi_idx[ x0 ][ y0 ]
        }
    }
    if( !pcm_flag[ x0 ][ y0 ] ) {
        if( CuPredMode[ x0 ][ y0 ] != MODE_INTRA && merge_flag[ x0 ][ y0
] = = 0)
            cu_cbf
        if( cu_cbf ) {
            if( CuPredMode[ x0 ][ y0 ] = = MODE_INTER &&
sps_sbt_enabled_flag &&
                !ciip_flag[ x0 ][ y0 ] ) {
                if(cbWidth <= MaxSbtSize &&
cbHeight <= MaxSbtSize ) {
                    allowSbtVerH = cbWidth >= 8
                    allowSbtVerQ = cbWidth >= 16
                    allowSbtHorH = cbHeight >= 8
                    allowSbtHorQ = cbHeight >= 16
                    if( allowSbtVerH || allowSbtHorH ||
allowSbtVerQ || allowSbtHorQ )
                        cu_sbt_flag
                }
                if( cu_sbt_flag ) {
                    if( ( allowSbtVerH || allowSbtHorH ) && (
allowSbtVerQ || allowSbtHorQ) )
                        cu_sbt_quad_flag
                    if( ( cu_sbt_quad_flag && allowSbtVerQ &&
allowSbtHorQ ) ||
                        ( !cu_sbt_quad_flag && allowSbtVerH
&& allowSbtHorH ) )
                        cu_sbt_horizontal_flag
                        cu_sbt_pos_flag
                }
            }
            transform_tree( x0, y0, cbWidth, cbHeight, treeType )
        }
    }
}
``` | <br><br><br><br><br><br>ae(v)<br><br><br><br><br>ae(v)<br><br><br><br><br><br><br><br><br><br><br>ae(v)<br><br><br><br>ae(v)<br><br><br><br>ae(v)<br>ae(v) |

5.2 Embodiment #2 on Selection of Reference Pictures Used in SMVD

5.2.1 One Example

This subsection gives one example corresponding to bullet 4 of section 4.

8.3.5 Decoding Process for Symmetric Motion Vector Difference Reference Indices Output of this process are RefIdxSymL0 and RefIdxSymL0 specifying the list 0 and list 1 reference picture indices for symmetric motion vector differences, i.e., when sym_mvd_flag is equal to 1 for a coding unit.

The variable RefIdxSymLX with X being 0 and 1 is derived as follows:

The variable currPic specifies the current picture.
RefIdxSymL0 is set equal to −1.
For each index i with i=0 . . . NumRefIdxActive[0]−1, the following applies:
  When all of the following conditions are true, RefIdxSymL0 is set to i:
    DiffPicOrderCnt(currPic, RefPicList[0][i])>0,
    DiffPicOrderCnt(currPic, RefPicList[0][i])<DiffPicOrderCnt(currPic, RefPicList[0][RefIdxSymL0]) or RefIdxSymL0 is equal to −1.
RefIdxSymL1 is set equal to −1.
For each index i with i=0 . . . NumRefIdxActive[1]−1, the following applies:
  When all of the following conditions are true, RefIdxSymL1 is set to i:
    DiffPicOrderCnt(currPic, RefPicList[1][i])<0,
    DiffPicOrderCnt(currPic, RefPicList[1][i])>DiffPicOrderCnt(currPic, RefPicList[1][RefIdxSymL1]) or RefIdxSymL1 is equal to −1.
When RefIdxSymL0 is equal to −1 *and* ~~or~~ RefIdxSymL1 is equal to −1, the following applies:
  For each index i with i=0 . . . NumRefIdxActive[0]−1, the following applies:
    When all of the following conditions are true, RefIdxSymL0 is set to i:
      DiffPicOrderCnt(currPic, RefPicList[0][i])<0,
      DiffPicOrderCnt(currPic, RefPicList[0][i])>DiffPicOrderCnt(currPic, RefPicList[0][RefIdxSymL0]) or RefIdxSymL0 is equal to −1.

For each index i with i=0 . . . NumRefIdxActive[1]−1, the following applies:
    When all of the following conditions are true, RefIdxSymL1 is set to i:
    DiffPicOrderCnt(currPic, RefPicList[1][i])>0,
    DiffPicOrderCnt(currPic, RefPicList[1][i])<DiffPicOrderCnt(currPic, RefPicList[1][RefIdxSymL1]) or RefIdxSymL1 is equal to −1.

5.2.2 One Example

This subsection gives one example corresponding to bullet 5 of section 4.

8.3.5 Decoding Process for Symmetric Motion Vector Difference Reference Indices Output of this process are RefIdxSymL0 and RefIdxSymL0 specifying the list 0 and list 1 reference picture indices for symmetric motion vector differences, i.e., when sym_mvd_flag is equal to 1 for a coding unit.
The variable RefIdxSymLX with X being 0 and 1 is derived as follows:
  The variable currPic specifies the current picture.
  RefIdxSymL0 is set equal to −1.
  For each index i with i=0 . . . NumRefIdxActive[0]−1, the following applies:
    When all of the following conditions are true, RefIdxSymL0 is set to i:
    DiffPicOrderCnt(currPic, RefPicList[0][i])>0,
    DiffPicOrderCnt(currPic, RefPicList[0][i])<DiffPicOrderCnt(currPic, RefPicList[0][RefIdxSymL0]) or RefIdxSymL0 is equal to −1.
  RefIdxSymL1 is set equal to −1.
  For each index i with i=0 . . . NumRefIdxActive[1]−1, the following applies:
    When all of the following conditions are true, RefIdxSymL1 is set to i:
    DiffPicOrderCnt(currPic, RefPicList[1][i])<0,
    DiffPicOrderCnt(currPic, RefPicList[1][i])>DiffPicOrderCnt(currPic, RefPicList[1][RefIdxSymL1]) or RefIdxSymL1 is equal to −1.
When RefIdxSymL0 is equal to −1 or RefIdxSymL1 is equal to −1, the following applies:
  For each index i with i =0 . . . NumRefIdxActive[0]−1, the following applies:
    When all of the following conditions are true, RefIdxSymL0 is set to i:
    DiffPicOrderCnt(currPic, RefPicList[0][i])<0,
    DiffPicOrderCnt(currPic, RefPicList[0][i])>DiffPicOrderCnt(currPic, RefPicList[0][RefIdxSymL0]) or RefIdxSymL0 is equal to −1.
  For each index i with i=0 . . . NumRefIdxActive[1]−1, the following applies:
    When all of the following conditions are true, RefIdxSymL1 is set to i:
    DiffPicOrderCnt(currPic, RefPicList[1][i])>0,
    DiffPicOrderCnt(currPic, RefPicList[1][i])<DiffPicOrderCnt(currPic, RefPicList[1][RefIdxSymL1]) or RefIdxSymL1 is equal to −1.

*When all of the following conditions are true, RefIdxSymL0 is set to −1 and RefIdxSymL1 is set to −1:*
  *RefIdxSymL0 != -1,*
  *RefIdxSymL1 != -1,*
  *DiffPicOrderCnt( currPic, RefPicList[ 0 ][ RefIdxSymL0 ] ) * DiffPicOrderCnt( currPic, RefPicList[ 1 ][ RefIdxSymL1 ] ) > 0.*
*Alternatively, the above conditions may be replaced by:*
  *When all of the following conditions are true, RefIdxSymL0 is set to −1 and RefIdxSymL1 is set to −1:*
  *RefIdxSymL0 >= 0,*
  *RefIdxSymL1 >= 0,*

5.2.3 One Example

This subsection gives one example corresponding to bullet 6 of section 4.

8.3.5 Decoding Process for Symmetric Motion Vector Difference Reference Indices Output of this process are RefIdxSymL0 and RefIdxSymL0 specifying the list 0 and list 1 reference picture indices for symmetric motion vector differences, i.e., when sym_mvd_flag is equal to 1 for a coding unit.
The variable RefIdxSymLX with X being 0 and 1 is derived as follows:
  The variable currPic specifies the current picture.
  RefIdxSymL0 is set equal to −1.
  For each index i with i =0 . . . NumRefIdxActive[0]−1, the following applies:
    When all of the following conditions are true, RefIdxSymL0 is set to i:
    DiffPicOrderCnt(currPic, RefPicList[0][i])>0,
    DiffPicOrderCnt(currPic, RefPicList[0][i])<DiffPicOrderCnt(currPic, RefPicList[0][RefIdxSymL0]) or RefIdxSymL0 is equal to −1.
  RefIdxSymL1 is set equal to −1.
  For each index i with i=0 . . . NumRefIdxActive[1]−1, the following applies:
    When all of the following conditions are true, RefIdxSymL1 is set to i:
    DiffPicOrderCnt(currPic, RefPicList[1][i])<0,
    DiffPicOrderCnt(currPic, RefPicList[1][i])>DiffPicOrderCnt(currPic, RefPicList[1][RefIdxSymL1]) or RefIdxSymL1 is equal to −1.
When RefIdxSymL0 is equal to −1 or RefIdxSymL1 is equal to −1, the following applies:
  For each index i with i =0 . . . NumRefIdxActive[0]−1, the following applies:
    When all of the following conditions are true, RefIdxSymL0 is set to i:
    DiffPicOrderCnt(currPic, RefPicList[0][i])<0,
    DiffPicOrderCnt(currPic, RefPicList[0][i])>DiffPicOrderCnt(currPic, RefPicList[0][RefIdxSymL0]) or RefIdxSymL0 is equal to −1.
  For each index i with i=0 . . . NumRefIdxActive[1]−1, the following applies:
    When all of the following conditions are true, RefIdxSymL1 is set to i:
    DiffPicOrderCnt(currPic, RefPicList[1][i])>0,
    DiffPicOrderCnt(currPic, RefPicList[1][i])<DiffPicOrderCnt(currPic, RefPicList[1][RefIdxSymL1]) or RefIdxSymL1 is equal to −1.

*When all of the following conditions are true, RefIdxSymL0 is set to −1 and RefIdxSymL1 is set to −1:*
  *RefIdxSymL0 != -1,*
  *RefIdxSymL1 != -1,*
  *DiffPicOrderCnt( currPic, RefPicList[ 0 ][ RefIdxSymL0 ] ) * DiffPicOrderCnt( currPic, RefPicList[ 1 ][ RefIdxSymL1 ] ) > 0.*
*Alternatively, the above conditions may be replaced by:*
  *When all of the following conditions are true, RefIdxSymL0 is set to −1 and RefIdxSymL1 is set to −1:*
  *RefIdxSymL0 >= 0,*
  *RefIdxSymL1 >= 0,*

DiffPicOrderCnt( currPic, RefPicList[
   0 ][ RefIdxSymL0 ] ) * DiffPicOrderCnt( currPic,
   RefPicList[ 1 ][ RefIdxSymL1 ] ) > 0.

5.3 Embodiment #1 on Usage of SMVD When mvd_l1_zero_flag is True

The working draft changes are marked as bold face italics.

mvd_signflag[compIdx] specifies the sign of a motion vector component difference as follows:
   If mvd_sign_flag[compIdx] is equal to 0, the corresponding motion vector component difference has a positive value.
   Otherwise (mvd_sign_flag[compIdx] is equal to 1), the corresponding motion vector component difference has a negative value.
When mvd_sign_flag[compIdx] is not present, it is inferred to be equal to 0.
The motion vector difference lMvd[compIdx] for compIdx=0 . . . 1 is derived as follows:

lMvd[compIdx]=abs_mvd_greater0_flag[compIdx]*
   (abs_mvd_minus2[compIdx]+2)*(1−
   2*mvd_sign_flag[compIdx])  (7-157)

The value of lMvd[compIdx] shall be in the range of $-2^{15}$ to $2^{15}-1$, inclusive.
When sym_mvd_flag[ x0 ][ y0 ] is equal to 1, the value of MvdL1[ x0 ][ y0 ][ 0 ] and
MvdL1[ x0 ][ y0 ][ 1 ] shall be in the
range of −215 to 215 − 1, inclusive,
after they are derived as:
   MvdL1[ x0 ][ y0 ][ 0 ] = −MvdL0[ x0 ][ y0 ][ 0 ]
   MvdL1[ x0 ][ y0 ][ 1 ] = −MvdL0[ x0 ][ y0 ][ 1 ].

Figure 14:
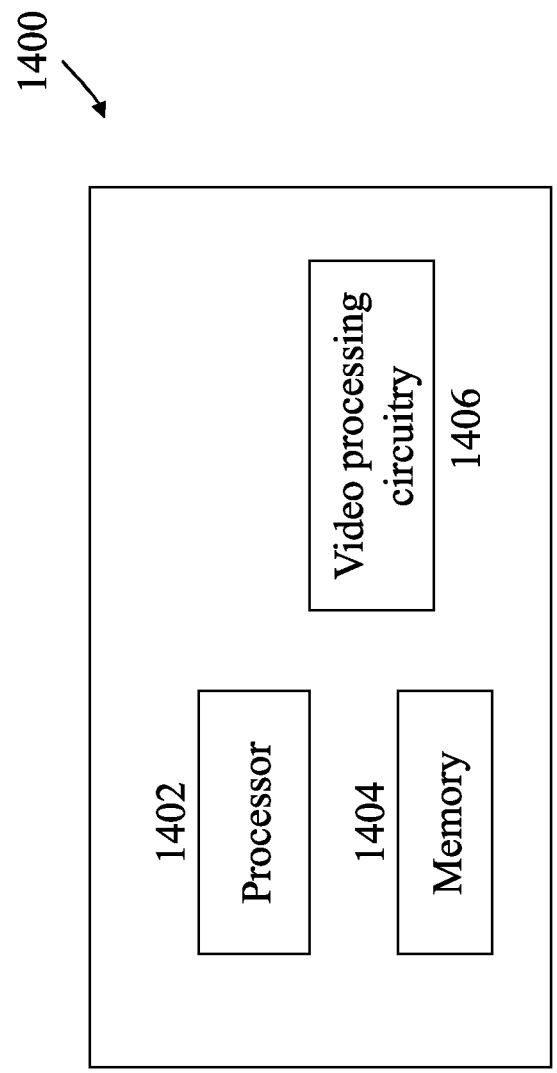
FIG. 14 is a block diagram of an example of a hardware platform used for implementing methods described in the present disclosure.

FIG. 14 is a block diagram of a video processing apparatus 1400. The apparatus 1400 may be used to implement one or more of the methods described herein. The apparatus 1400 may be embodied in a smartphone, tablet, computer, Internet of Things (IoT) receiver, and so on. The apparatus 1400 may include one or more processors 1402, one or more memories 1404 and video processing hardware 1406. The processor(s) 1402 may be configured to implement one or more methods described in the present disclosure. The memory (memories) 1404 may be used for storing data and code used for implementing the methods and techniques described herein. The video processing hardware 1406 may be used to implement, in hardware circuitry, some techniques described in the present disclosure.

Figure 15:
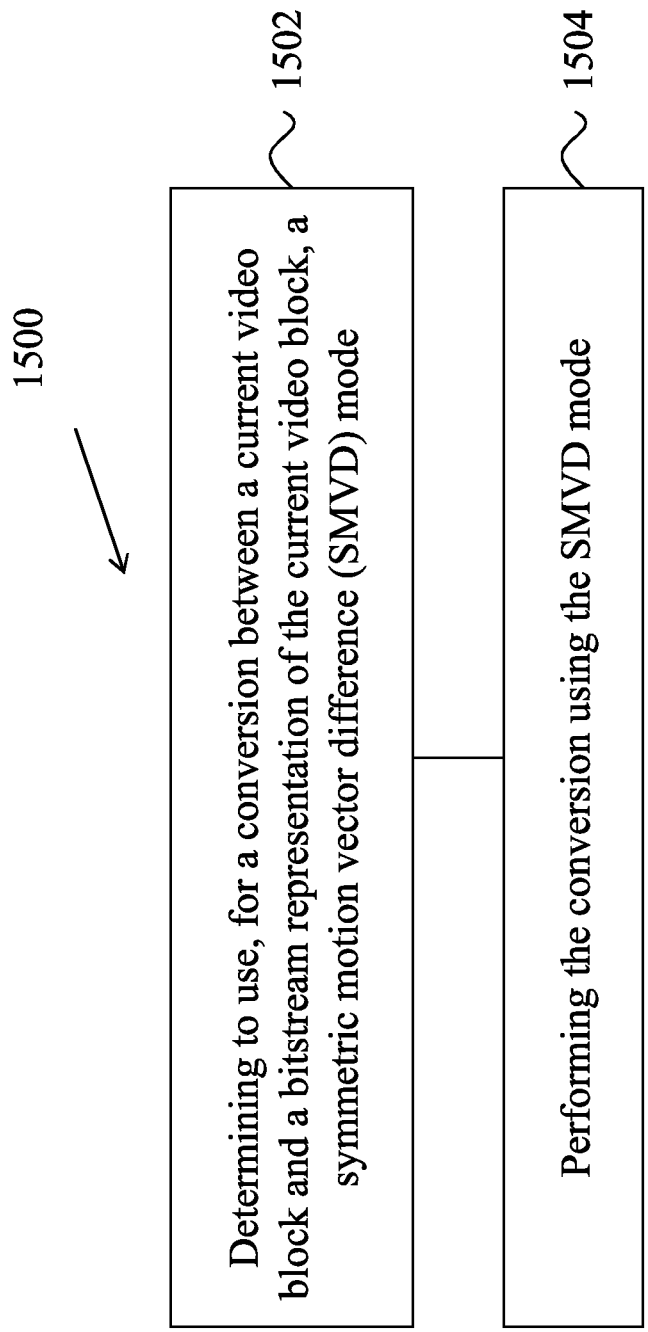
FIG. 15 is a flowchart for an example method of video processing.

FIG. 15 is a flowchart for an example method 1500 of video processing. The method 1500 includes determining (1502) to use, for a conversion between a current video block and a bitstream representation of the current video block, a symmetric motion vector difference (SMVD) mode in which two additional motion candidates generated for the conversion based on symmetric displacement of reference blocks in two target reference pictures from a reference list 0 and a reference list 1 of reference pictures. The method 1500 includes performing (1504) the conversion using the SMVD mode. The bitstream representation indicates to disable use of a motion vector difference (MVD) mode for one of the reference list 0 or the reference list 1.

The following listing of examples provide embodiments that can addressed the technical problems described in the present disclosure, among other problems.

1. A method of video processing, comprising: determining to use, for a conversion between a current video block and a bitstream representation of the current video block, a symmetric motion vector difference (SMVD) mode in which two additional motion candidates generated for the conversion based on symmetric displacement of reference blocks in two target reference pictures from a reference list 0 and a reference list 1 of reference pictures; and performing the conversion using the SMVD mode; wherein the bitstream representation indicates to disable use of a motion vector difference (MVD) mode for one of the reference list 0 or the reference list 1.

2. The method of example 1, wherein the bitstream representation indicates to disable use of the MVD mode for reference list 1, wherein the conversion includes deriving a motion candidate corresponding to the reference list 1 from a motion candidate corresponding to the reference list 0 using a relationship.

3. The method of example 2, wherein the relationship specifies to use the motion candidate corresponding to the reference list 1 by mirroring the motion candidate corresponding to the reference list 0.

Additional embodiments of examples 1-3 are described in Item 1 in section 4.

4. A method of video processing, comprising: determining to use, for a conversion between a current video block and a bitstream representation of the current video block, a symmetric motion vector difference (SMVD) mode in which two additional motion candidates generated for the conversion based on symmetric displacement of reference blocks in pictures from two target reference pictures from a reference list 0 and a reference list 1 of reference pictures; and performing the conversion using the SMVD mode; wherein the bitstream representation includes a motion vector difference (MVD) information for the reference list 1.

5. The method of example 4, wherein the MVD information for the reference list 1 is a function of a video unit in which the current video block is located.

6. The method of example 5, wherein the video unit is a slice or a tile group or a tile or a brick or a coding unit.

7. The method of example 4, wherein an identity of the reference list 1 is dependent on reference lists used for a neighboring video block of the current video block.

8. The method of example 4, wherein the reference list 1 is chosen due to having a smaller temporal distance to the current video block that the reference list 0.

9. The method of example 4, wherein the reference list 1 is chosen due to having a greater temporal distance to the current video block than the reference list 0.

Additional embodiments of examples 4-9 are described in Item 2 in section 4.

10. The method of any of examples 1 to 9, wherein the reference list 0 and the reference list 1 are identical to each other.

11. The method of example 10, wherein one of the reference list 0 and the reference list 1 is used for forward prediction and the other is used for backward prediction.

Additional embodiments of examples 10-11 are described in Item 3 in section 4.

12. A method of video processing, comprising: determining to use, for a conversion between a current video block and a bitstream representation of the current video block, a symmetric motion vector difference (SMVD) mode in which two additional motion candidates generated for the conversion based on symmetric displacement of reference blocks in pictures from a reference list 0 and a reference list 1 of reference pictures; and performing the conversion using the SMVD mode; wherein the SMVD generates the two additional motion candidates using a first step in which each reference picture list is parsed to identify target reference pictures.

13. The method of example 12, wherein the SMVD generates the two additional motion candidates further optionally using a second step after the first step to identify the target reference pictures.

14. The method of example 13, wherein the second step optional based on number of reference pictures found in the first step.

Additional embodiments of examples 12-14 are described in Item 4 in section 4.

15. A method of video processing, comprising: determining to use, for a conversion between a current video block and a bitstream representation of the current video block, a symmetric motion vector difference (SMVD) mode in which two additional motion candidates generated for the conversion based on symmetric displacement of reference blocks in two target reference pictures from a reference list 0 and a reference list 1 of reference pictures; and performing the conversion using the SMVD mode; wherein the SMVD generates the two additional motion candidates such that: both target reference picture indices are found in either a first step that includes searching forward in list 0 for the target reference picture in list 0, and searching backward in list 1 for the target reference picture in list 1, or in a second step that includes searching backward in list 0 for the target reference picture in list 0, and searching forward in list 1 for the target reference picture in list 1.

Additional embodiments of example 15 are described in Item 5 in section 4.

16. A method of video processing, comprising: determining to use, for a conversion between a current video block and a bitstream representation of the current video block, a symmetric motion vector difference (SMVD) mode in which two additional motion candidates generated for the conversion based on symmetric displacement of reference blocks in two target reference pictures from a reference list 0 and a reference list 1 of reference pictures; and performing the conversion using the SMVD mode; wherein one of the two target reference picture has a picture order count greater than that of the current video block and another of the two target reference pictures has a picture order count less than that of the current video block.

17. The method of example 16, wherein the SMVD mode further includes a step of ascertaining distances between picture order counts of the current video block and the two target reference pictures.

Additional embodiments of examples 16-17 are described in Item 6 in section 4.

18. A method of video processing, comprising: determining, based on a condition, whether or not to use a symmetric motion vector difference (SMVD) mode in which two additional motion candidates generated for the conversion based on symmetric displacement of reference blocks in two target reference pictures from a reference list 0 and a reference list 1 of reference pictures, for a conversion between a current video block and a bitstream representation of the current video block; and performing the conversion based on the determining.

19. The method of example 18, where the condition comprises coding information of the current video block.

20. The method of example 19, wherein the condition comprises motion vector difference or prediction weights for bi-directional prediction for the current video block.

21. The method of example 18, wherein the SMVD mode is disabled for the condition that unequal weights are used for bidirectional prediction.

22. The method of example 18, wherein the SMVD mode is disabled for the condition that motion vector precision is an integer value.

Additional embodiments of examples 18-22 are described in Item 8 in section 4.

23. A method of video processing, comprising: determining, based on a condition to use a symmetric motion vector difference (SMVD) mode in which two additional motion candidates generated for the conversion based on symmetric displacement of reference blocks in two target reference pictures from a reference list 0 and a reference list 1 of reference pictures, and a decoder side motion vector difference (DMVD) coding mode for a conversion between a current video block and a bitstream representation of the current video block; and performing the conversion based on the determining.

24. The method of example 1, wherein the DMVD comprises decoder side motion vector refinement.

25. The method of any of examples 23-24, wherein the condition includes using an N pixel precision for motion vector and motion vector difference calculation during the conversion and wherein the DMVD refines by M pixel resolution, where N and M are integers or fractions.

26. The method of any of examples 23 to 25, wherein N, M = $\frac{1}{16}$, $\frac{1}{8}$, $\frac{1}{4}$, $\frac{1}{2}$, 1, 2, 4, 8, or 16.

Additional embodiments of examples 23-26 are described in Item 9 in section 4.

27. A method of video processing, comprising: determining, based on a condition, whether or not to use an all-zero motion vector difference for a symmetric motion vector difference (SMVD) mode in which two additional motion candidates generated for the conversion based on symmetric displacement of reference blocks in two target reference pictures from a reference list 0 and a reference list 1 of reference pictures, and a decoder side motion vector difference (DMVD) coding mode for a conversion between a current video block and a bitstream representation of the current video block; and performing the conversion based on the determining.

28. The method of example 27, wherein the condition disables using the all-zero motion vector difference.

Additional embodiments of examples 27-28 are described in Item 10 in section 4.

29. A method for video processing, comprising selecting a first reference picture and a second reference picture from a plurality of reference pictures associated with a current video block, and performing, based on the selected first and second reference pictures, a conversion between the current video block and a bitstream representation of the current video block, wherein a first distance between the first reference picture and a current picture comprising the current video block and a second distance between the second reference picture and the current picture are equal.

30. The method of example 29, wherein the first reference picture is selected from list 0, and wherein the second reference picture is selected from list 1.

31. The method of example 29, wherein the first reference picture is a forward reference picture from list 0, and wherein the second reference picture is a backward reference picture from list 1.

32. The method of example 29, wherein the first reference picture is a backward reference picture from list 0, and wherein the second reference picture is a forward reference picture from list 1.

33. The method of example 29, wherein the first reference picture is a forward reference picture, wherein the second reference picture is a backward reference picture, and wherein the first and second reference pictures are from a same list.

Additional embodiments of examples 29-33 are described in Item 11 in section 4.

34. A method for video processing, comprising determining that a first distance between a first reference picture and a current picture comprising a current video block and a second distance between a second reference picture and the current picture are unequal, and disabling, based on the determining and for a conversion between the current video block and a bitstream representation of the current video block, a symmetric motion vector difference (SMVD) mode for the current video block.

35. The method of example 34, wherein the bitstream representation excludes signaling one or more SMVD related syntax elements.

Additional embodiments of examples 34-35 are described in Item 12 in section 4.

36. A method for video processing, comprising deriving, for a current video block, a first motion vector difference (MVD) of a first reference picture list based on a second MVD of a second reference picture list, and performing, based on the deriving, a conversion between the current video block and a bitstream representation of the current video block, wherein the a range of the first MVD is restricted.

37. The method of example 36, wherein the deriving is based on a symmetric motion vector difference (SMVD) method.

38. The method of example 36 or 37, wherein the range is [−2N, 2N−1] and N is a positive integer.

39. The method of example 36 or 37, wherein the range is [−2 N +1, 2 N −1] and N is a positive integer.

40. The method of example 38 or 39, wherein N =16 or N =18.

Additional embodiments of examples 36-40 are described in Item 14 in section 4.

41. The method of any of examples 1 to 40, wherein the conversion includes generating pixel values of the current video block from the bitstream representation.

42. The method of any of examples 1 to 40, wherein the conversion includes generating the bitstream representation from pixel values of the current video block.

43. A video processing apparatus comprising a processor configured to implement one or more of examples 1 to 42.

44. A computer-readable medium having code stored thereon, the code, when executed by a processor, causing the processor to implement a method recited in any one or more of examples 1 to 42.

Figure 16:
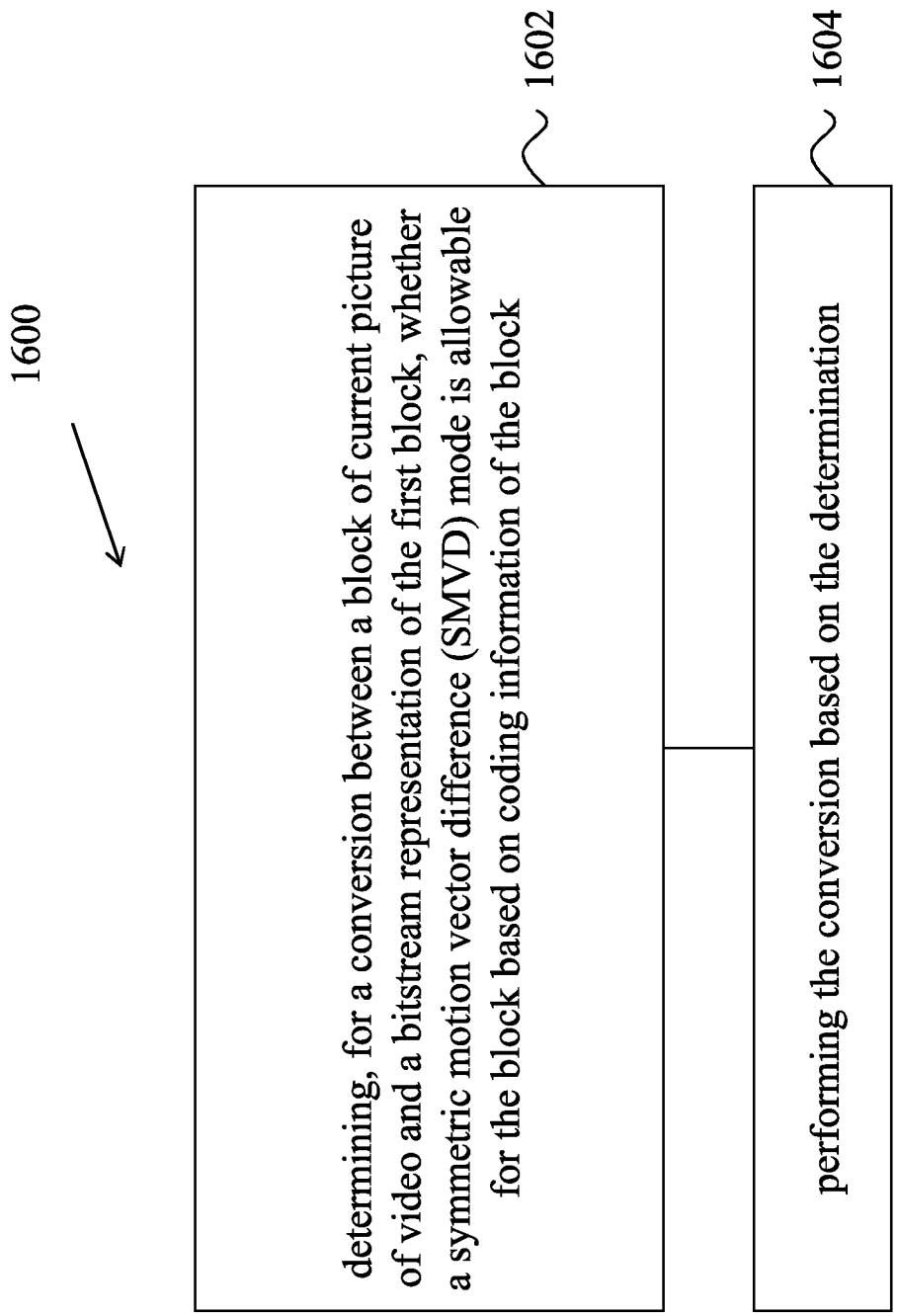
FIG. 16 is a flowchart for an example method of video processing.

FIG. 16 is a flowchart for an example method 1600 of video processing. The method 1600 includes, at 1602, determining, for a conversion between a block of current picture of video and a bitstream representation of the first block, whether a symmetric motion vector difference (SMVD) mode is allowable for the block based on coding information of the block; and at 1604, performing the conversion based on the determination.

In some examples, in the SMVD mode, motion vector difference (MVD) is only signaled for a reference list Y of two reference lists including a reference list X and the reference list Y, where Y=1−X, and the signaled MVD in the reference list Y is used for deriving the MVD in the reference list X, where X=0 or 1.

In some examples, X=0.

In some examples, the coding information includes a flag indicating whether MVD in reference list X is forced to be zero, X=0 or 1.

In some examples, even when the flag indicates the MVD in the reference list X is forced to be zero, the SMVD mode is allowed for the block.

In some examples, when the flag indicates the MVD in the reference list 1 is forced to be zero, the MVD in the reference list 1 is forced to be zero, and the SMVD mode is allowed for the block.

In some examples, when the flag indicates the MVD in the reference list 1 is forced to be zero, the MVD in the reference list 1 is not forced to be zero, but is derived from associated MVD in reference list 0, and the SMVD mode is allowed for the block.

In some examples, when the flag indicates the MVD in the reference list X is forced to be zero, the SMVD mode is disallowed for the block.

In some examples, when the SMVD mode is disallowed, all related syntax elements for the SMVD mode are implicitly derived instead of being signaled.

In some examples, the reference list Y for which the MVD need to be signaled is signaled by an indication of in the bitstream.

In some examples, the indication is signaled in at least one of the sequence, picture, slice, tile, video unit level.

In some examples, the indication is signaled in at least one of sequence parameter set (SPS) and picture parameter set (PPS), picture header, slice header, and tile group header.

In some examples, the reference list Y for which the MVD need to be signaled is derived according to reference pictures in the reference lists.

In some examples, the reference list Y for which the MVD need to be signaled is derived according to two reference pictures in the two reference lists and corresponding two parameters of Abs (currPocDiffL0) and Abs (currPocDiffL1), where Abs (currPocDiffL0) indicates an absolute value of POC (picture order count) distance from the current picture to the reference picture in the reference list 0, and Abs (currPocDiffL1) indicates an absolute value of POC distance from the current picture to the reference picture in the reference list 1.

In some examples, if Abs (currPocDiffL0) is greater than Abs(currPocDiffL1), MVD for the reference list 0 is signaled, otherwise, MVD for the reference list 1 is signaled.

In some examples, if Abs (currPocDiffL0) is greater than Abs(currPocDiffL1), MVD for the reference list 1 is signaled, otherwise, MVD for the reference list 0 is signaled.

In some examples, if Abs (currPocDiffL0) is greater than or equal to Abs(currPocDiffL1), MVD for the reference list 0 is signaled, otherwise, MVD for the reference list 1 is signaled.

In some examples, if Abs (currPocDiffL0) is greater than or equal to Abs(currPocDiffL1), MVD for the reference list 1 is signaled, otherwise, MVD for the reference list 0 is signaled.

In some examples, if Abs (currPocDiffL0) is equal to Abs(currPocDiffL1), MVD for the reference list 0 is signaled, otherwise, MVD for the reference list 1 is signaled.

In some examples, if Abs (currPocDiffL0) is equal to Abs(currPocDiffL1), MVD for the reference list 1 is signaled, otherwise, MVD for the reference list 0 is signaled.

In some examples, the reference list Y for which the MVD need to be signaled is changed from one video unit to another video unit.

In some examples, the video unit includes at least one of slice, tile group, tile, brick and coding unit (CU).

In some examples, selection of the reference list Y depends on reference pictures information of neighboring blocks of the block.

In some examples, selection of the reference list Y depends on two reference pictures in the two reference lists and corresponding two parameters of PocDist0 and PocDist1, where PocDist0 is absolute value of picture order count (POC) distance from the reference picture in reference list 0 to the current picture, and PocDist1 is absolute value of POC distance from the reference picture in reference list 1 to the current picture.

In some examples, the reference list with a smaller absolute value of POC distances between PocDist0 and PocDist1 is selected as the reference list Y.

In some examples, the reference list with a larger absolute value of POC distances between PocDist0 and PocDist1 is selected as the reference list Y.

In some examples, if PocDist0 and PocDist1 is equal, either the reference list 0 or the reference list 1 is selected as the reference list Y.

In some examples, in the SMVD mode, two reference pictures both are selected from one same reference list.

In some examples, one of the two reference pictures is forward reference picture whose POC is smaller than the current POC and the other is backward reference picture whose POC is larger than the current POC.

In some examples, all reference pictures in the reference list 0 and the reference list 1 are checked in order to find a first reference picture whose POC is closest to the current POC among all the POCs of reference pictures which are smaller than the current POC, and a second reference picture whose POC is closest to the current POC among all the POCs of reference pictures which are larger than the current POC.

In some examples, the SMVD mode includes a derivation process of target reference pictures, which includes a first step for searching a forward target reference picture in the reference list 0, and searching a backward target reference picture in the reference list 1, and a second step for searching a backward target reference picture in the reference list 0, and searching a forward target reference picture in the reference list 1.

In some examples, when at least one of the target reference pictures is found from the first step, the second step of the SMVD mode is skipped.

In some examples, if one target reference picture is found in the reference list 0 and no target reference picture is found in the reference list 1, the second step of the SMVD mode is skipped.

In some examples, if no target reference picture is found in the reference list 0 and one target reference picture is found in the reference list 1, the second step of the SMVD mode is skipped.

In some examples, when at least one of the target reference pictures is not found from the first step, the SMVD mode is disallowed, and signaling of all SMVD related syntaxes are skipped.

In some examples, the two target reference pictures found in the derivation process of target reference pictures include a forward reference picture whose POC is smaller than the current picture and a backward reference picture whose POC is larger than the current picture.

In some examples, after the derivation process of the two target reference pictures, POC of the two target reference pictures are checked, and the target reference pictures are reset to be unavailable if the two target reference pictures both have smaller POCs than the current picture or larger POCs than the current picture.

In some examples, the target reference pictures can be reset to be unavailable by resetting RefIdxSymL0 and RefIdxSymL1 to −1, where RefIdxSymL0 is index of the target reference picture in the reference list 0, and RefIdxSymL1 is index of the target reference picture in the reference list 0.

In some examples, when (RefIdxSymL1!=−1 && RefIdxSymL0!=−1 && DiffPicOrderCnt(currPic, RefPicList[0][RefIdxSymL1])*DiffPicOrderCnt(currPic, RefPicList[1][RefIdxSymL1])>0) is true, the target reference pictures are reset to be unavailable, wherein DiffPicOrderCnt(pic0, pic1) returns the POC distance from the picture pic0 to the picture pic1.

In some examples, the SMVD mode includes a derivation process of target reference pictures, which removes the restriction of finding forward reference picture from reference list 0 and backward reference picture from reference list 1, or finding forward reference picture from reference list 1 and backward reference picture from reference list 0.

In some examples, the target reference pictures used in SMVD mode are derived with two dependent checks including a first check and a second check, each check being used for one of the reference list 0 and the reference list 1.

In some examples, the first check is to find one reference picture in the reference list X, where X being 0 or 1, and the second check is to find one reference picture in the reference list Y according to the output of the first check and reference pictures in the reference list Y, Y=1−X.

In some examples, for the reference list X, POC distances between each reference pictures and the current picture are calculated regardless it is forward or backward according to a given order.

In some examples, the given order is the ascending or descending order of reference picture index.

In some examples, the reference picture which has the smallest POC distance is selected as the target reference picture for the reference list X and denoted by RefInLX.

In some examples, the reference picture which has the greatest POC distance is selected as the target reference picture for the reference list X and denoted by RefInLX.

In some examples, one reference picture is selected from the reference list Y according to the reference picture RefInLX as the target reference picture for the reference list Y.

In some examples, if the reference picture RefInLX has a smaller POC distance compared to the current picture, the target reference picture for the reference list Y has a larger POC distance compared to the current picture.

In some examples, if the reference picture RefInLX has a larger POC distance compared to the current picture, the target reference picture for the reference list Y has a smaller POC distance compared to the current picture.

In some examples, if the reference picture RefInLX is a forward reference picture, the target reference picture for the reference list Y is the one with the smallest POC distance compared to the current picture among all backward reference pictures.

In some examples, if the reference picture RefInLX is a backward reference picture, the target reference picture for the reference list Y is the one with the smallest POC distance compared to the current picture among all forward reference pictures.

In some examples, the coding information includes at least one of motion vector (MV) information, MVD precision information for the block and weights of prediction samples in bi-prediction.

In some examples, the SMVD mode is disallowed when unequal weights are selected for the bi-predicted blocks.

In some examples, when the SMVD mode is disallowed, all related syntax elements related to the SMVD mode are not signaled and/or implicitly derived.

In some examples, unequal weights are disallowed in the SMVD mode.

In some examples, when the unequal weights are disallowed, all syntax elements related to the unequal weights are not signaled and/or implicitly derived.

In some examples, the SMVD mode is disallowed for certain MVD precision and/or MV precision.

In some examples, the SMVD mode is disallowed for N-pel MVD precision and/or MV precision, where N=1 or 4.

In some examples, only MVD precision and/or MV precision is allowed in the SMVD mode, N=¼.

In some examples, when the SMVD mode is disallowed, all syntax elements related to the SMVD mode are not signaled and implicitly derived.

In some examples, Adaptive motion vector difference resolution (AMVR) is disallowed in the SMVD mode.

In some examples, when AMVR is disallowed, all syntax elements related to AMVR are not signaled and implicitly derived.

In some examples, decoder-side motion vector refinement (DMVR) or/and other decoder-side motion vector derivation (DMVD) methods are enabled in the SMVD mode.

In some examples, in the SMVD mode, if the MV and/or MVD precision is N-pel, DMVR or/and other DMVD methods are used to refine the MVD by a parameter mvdDmvr, mvdDmvr is with M-pel precision, where N, M=¹⁄₁₆, ⅛, ¼, ½, 1, 2, 4, 8 or 16.

In some examples, M is smaller than or equal to N.

In some examples, in the SMVD mode, the MVD is derived by DMVR or/and other DMVD methods instead of being signaled.

In some examples, in the SMVD mode, AMVR information is not signaled, and the MV/MVD precision is derived to be with a predefined value, where the predefined value is ¼-pel precision.

In some examples, in the SMVD mode, indication of whether DMVR or/and other DMVD methods are applied or not is signaled.

In some examples, if DMVR or/and other DMVD methods are applied, MVD is not signaled.

In some examples, the indication is signaled for certain MV and/or MVD precisions.

In some examples, the indication is signaled for 1-pel or/and 4-pel MV and/or MVD precisions.

In some examples, the indication is signaled only when PocDist0 is equal to PocDist1, wherein PocDist0 is the POC distance between the current picture and Ref0 and PocDist1 is the POC distance between the current picture and Ref1, and Ref0 is a preceding picture and Ref1 is a following picture of the current picture in display order.

In some examples, the indication is signaled only when PocDist0 is equal to PocDist1, wherein PocDist0 is the POC distance between the current picture and Ref0 and PocDist1 is the POC distance between the current picture and Ref1, and Ref0 is a following picture and Ref1 is a preceding picture of the current picture in display order.

In some examples, in the SMVD mode, whether all-zero MVD is allowed or not depends on the coding information of the block including SMVD mode information and motion information of the block.

In some examples, all-zero MVD is disallowed in the SMVD mode.

In some examples, if horizontal MVD is zero in the SMVD mode, vertical MVD is decreased by 1 if vertical MVD is positive or increased by 1 if vertical MVD is negative before encoding, and is increased by 1 if vertical MVD is positive or decreased by 1 if vertical MVD is negative after decoding.

In some examples, if vertical MVD is zero in the SMVD mode, horizontal MVD is decreased by 1 if horizontal MVD is positive or increased by 1 if horizontal MVD is negative before encoding, and is increased by 1 if horizontal MVD is positive or decreased by 1 if horizontal MVD is negative after decoding.

In some examples, in the SMVD mode, a higher priority is given to find two target reference pictures with the equal distance to the current picture instead of finding the closest reference pictures.

In some examples, when there are N pairs of reference pictures in the reference list 0 and the reference list 1, denoted by (RefL0i, RefL1i) with i being [0, N−1], one of the N pairs is selected as the target two reference pictures used in the SMVD mode, where N is an integer.

In some examples, for a pair of reference pictures, one reference picture is from the reference list 0 and the other is from the reference list 1.

In some examples, for a pair of reference pictures, one reference picture is a forward reference picture from the reference list 0 and the other is a backward reference picture from the reference list 1.

In some examples, for a pair of reference pictures, one reference picture is a backward reference picture from the reference list 0 and the other is a forward reference picture from the reference list 1.

In some examples, for a pair of reference pictures, one reference picture is a backward reference picture and the other is a forward reference picture, with both from the same reference picture list.

In some examples, when there are N pairs of reference pictures in the reference list 0 and the reference list 1, denoted by (RefL0i, RefL1i) with i being [0, N−1], one of the N pairs with the smallest or largest absolute value of POC distances to the current picture is selected as the target two reference pictures used in the SMVD mode, where N is an integer.

In some examples, when there is no pair of reference pictures with the equal distance to the current picture in the reference list 0 and the reference list 1, target reference pictures are selected according to the POC distances to the current picture.

In some examples, when two target reference pictures are with unequal distance to the current picture, the SMVD mode is disallowed.

In some examples, signaling of SMVD related syntax elements including sym_mvd_flag is skipped and the SMVD mode is inferred not be used.

In some examples, the MVD of the reference picture list X is derived from the signaled MVD of reference picture list Y according to POC distances of two reference pictures and the current picture.

In some examples, when the signaled MVD for the reference list Y is MvdLY with its horizontal and vertical component denoted by MvdLY[0] and MvdLY[1], the MVD for the reference list X denoted by (MvdLX[0], MvdLX[1]) is derived as following:

MvdLX[0]=MvdLY[0]*(POC(targetRef in List X)−POC (current picture))/(POC(targetRef in List Y)−POC(current picture)), and MvdLX[1]=MvdLY[1]*(POC(targetRef in List X)−POC (current picture))/(POC(targetRef in List Y)−POC(current picture)), where POC(targetRef in List X) is a POC of the reference picture in the reference list X, POC(targetRef in List Y) is a POC of the reference picture in the reference list X, and POC(current picture) is a POC of the current picture.

In some examples, in the SMVD mode, the MVD of the reference list Y is scaled according to POC distances when deriving the MVD of the reference list X, instead of using the opposite MVD of the reference list Y as the MVD for the reference list X, where X=1.

In some examples, in the SMVD mode, the MVD of the reference list Y is scaled according to POC distances when deriving the MVD of the reference list X, instead of using the opposite MVD of the reference list Y as the MVD for the reference list X, where X=0.

Figure 17:
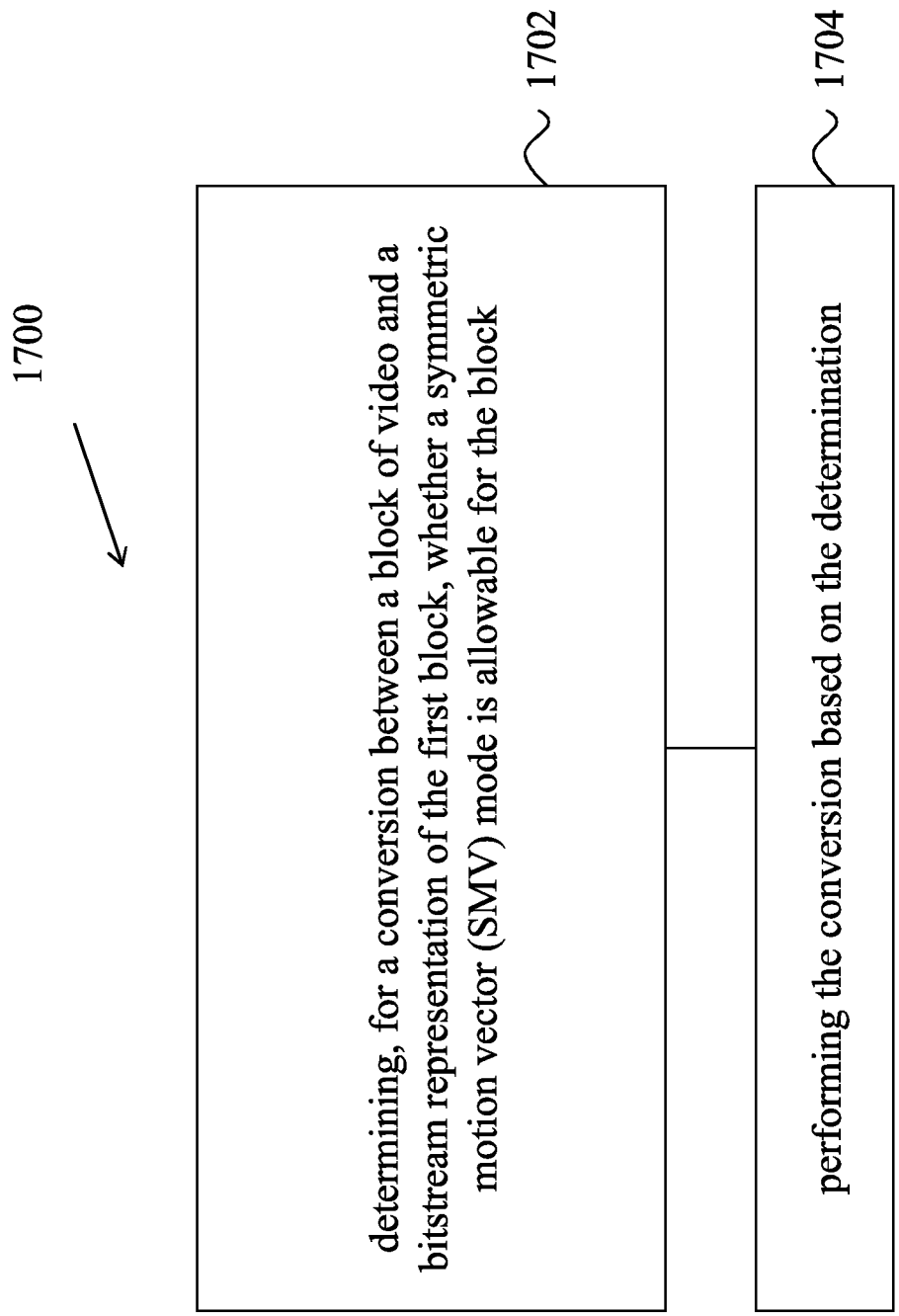
FIG. 17 is a flowchart for an example method of video processing.

FIG. 17 is a flowchart for an example method 1700 of video processing. The method 1700 includes, at 1702, determining, determining, for a conversion between a block of video and a bitstream representation of the first block, whether a symmetric motion vector (SMV) mode is allowable for the block according to the method of previous examples; and at 1704, performing the conversion based on the determination.

FIG. 18 is a flowchart for an example method 1800 of video processing. The method 1800 includes, at 1802, determining, for a conversion between a block of a current picture of video and a bitstream representation of the block, whether a symmetric motion vector difference (SMVD) mode is allowable for the block, wherein whether the SMVD mode is allowable depends on a derivation process of two target reference pictures of the current picture, which includes a first step for searching a forward target reference picture in the reference picture list 0 and searching a backward target reference picture in the reference picture list 1, and a second step for searching a backward target reference picture in the reference picture list 0 and searching a forward target reference picture in the reference picture list 1, outputs of the first step and the second step being independent of each other; and at 1804, performing the conversion based on the determination.

In some examples, whether the SMVD mode is allowable is depends on whether both the target reference pictures are found in one step of the first step and the second step.

In some examples, when both the target reference pictures are found in the first step, the SMVD mode is allowed.

In some examples, when both the target reference pictures are found in the second step, the SMVD mode is allowed.

In some examples, when both the target reference pictures are not found in the first step and both the target reference pictures are not found in the second step, the SMVD mode is disallowed.

In some examples, when at least one of the two target reference pictures is not found in the first step, the second step is invoked.

In some examples, before invoking the second step, both the target reference picture indices are reset to be unavailable.

In some examples, when the indices of the two target reference pictures include variables of RefIdxSymL0 and RefIdxSymL1, with RefIdxSymL0 indicating the target reference picture index in the reference picture list 0 and RefIdxSymL1 indicating the target reference picture index in the reference picture list 1.

In some examples, resetting both the target reference picture indices to be unavailable comprises resetting both RefIdxSymL0 and RefIdxSymL1 to −1.

In some examples, in the SMVD mode, motion vector difference (MVD) is only signaled for a reference list Y of two reference lists including a reference list X and the reference list Y, where Y=1−X, and the signaled MVD in the reference list Y is used for deriving the MVD in the reference list X, where X=0 or 1.

Figure 19:
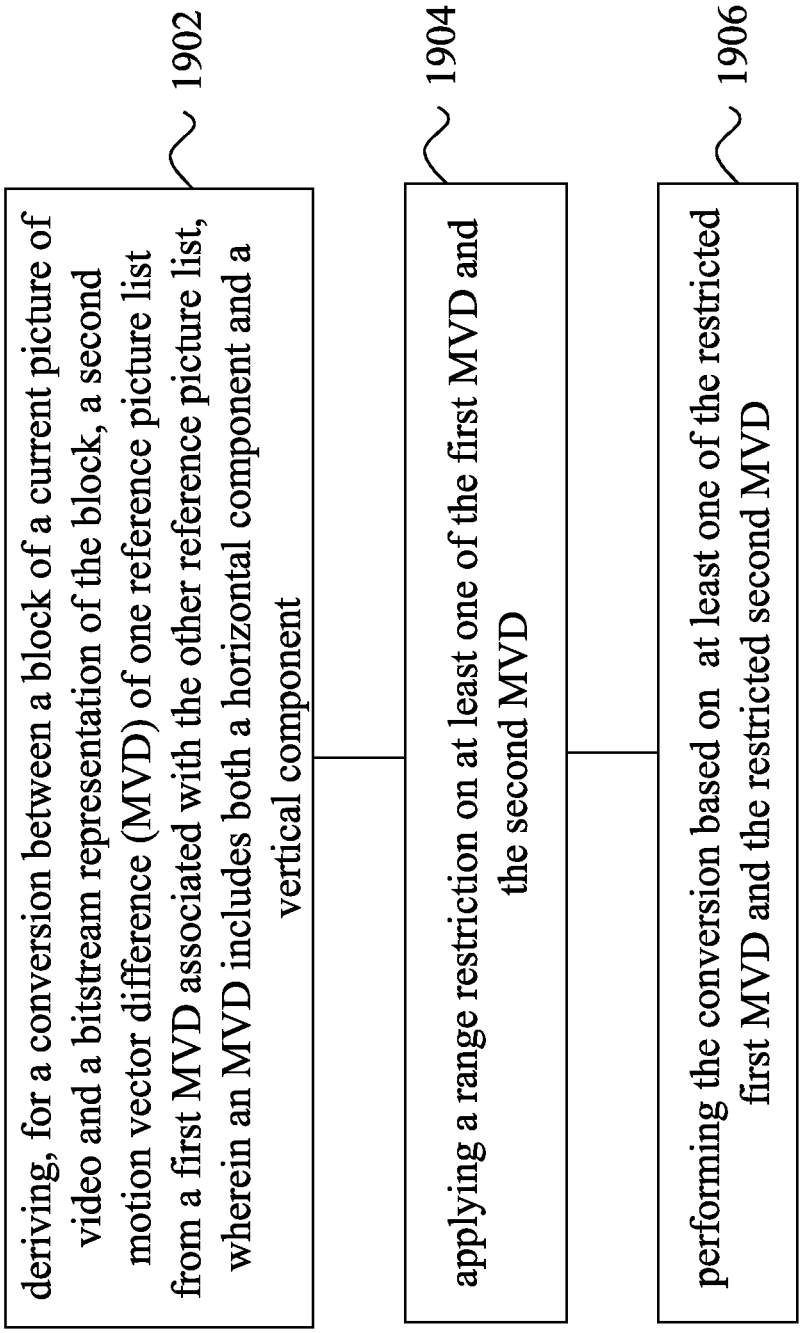
FIG. 19 is a flowchart for an example method of video processing.

FIG. 19 is a flowchart for an example method 1900 of video processing. The method 1900 includes, at 1902, deriving, for a conversion between a block of a current picture of video and a bitstream representation of the block, a second motion vector difference (MVD) of one reference picture list from a first MVD associated with the other reference picture list, wherein an MVD includes both a horizontal component and a vertical component; and at 1904, applying a range restriction on at least one of the first MVD and the second MVD; and at 1906, performing the conversion based on the determination.

In some examples, the first MVD is included in the bitstream representation of the block.

In some examples, the second MVD is derived from the first MVD in a symmetric motion vector difference (SMVD) mode.

In some examples, the horizontal component and/or the vertical component of the derived second MVD are restricted in a predefined range.

In some examples, the horizontal component and/or the vertical component of the derived second MVD are clipped or conditionally modified according to the predefined range.

In some examples, Mz is clipped as Mz=Clip3($-2^N$, $2^N-1$, Mz), where Mz represents the horizontal component or the vertical component of the derived second MVD, N being an integer, wherein $$\text{Clip3}(x, y, z) = \begin{cases} x & ; \quad z < x \\ y & ; \quad z > y \\ z & ; \quad \text{otherwise} \end{cases}.$$

In some examples, N=15, 16, 17 or 18.

In some examples, Mz is clipped as Mz=Clip3($-2^N+1$, $2^N-1$, Mz), where Mz represents the horizontal component or the vertical component of the derived second MVD, N being an integer.

In some examples, N=15, 16, 17 or 18.

In some examples, Mz is modified as Mz=$2^N-1$ if Mz=$2^N$, where Mz represents the horizontal component or the vertical component of the derived second MVD, N being an integer.

In some examples, N=15, 16, 17 or 18.

In some examples, the horizontal component and/or the vertical component of the derived second MVD are within a predefine range in a conformance bitstream.

In some examples, the horizontal component and/or the vertical component of the derived second MVD are within the range of $[-2^N, 2^N-1]$ inclusively in a conformance bitstream.

In some examples, N=15, 16, 17 or 18.

In some examples, the horizontal component and/or the vertical component of the derived second MVD are within the range of $[-2^N+1, 2^N-1]$ inclusively in a conformance bitstream.

In some examples, N=15, 16, 17 or 18.

In some examples, the horizontal component and/or the vertical component of the first MVD are clipped or conditionally modified according to a first predefined range so that the horizontal component and/or the vertical component of the derived second MVD are in a second predefined range.

In some examples, Mz is clipped as Mz=Clip3($-2^N+1$, $2^N-1$, Mz), where Mz represents the horizontal component or the vertical component of the first MVD, N being an integer, wherein $$\text{Clip3}(x, y, z) = \begin{cases} x & ; \quad z < x \\ y & ; \quad z > y \\ z & ; \quad \text{otherwise} \end{cases}.$$

In some examples, N=15, 16, 17 or 18.

In some examples, Mz is modified as Mz=$-2^N+1$ if Mz=$-2^N$, where Mz represents the horizontal component or the vertical component of the first MVD, N being an integer.

In some examples, N=15, 16, 17 or 18.

In some examples, the horizontal component and/or the vertical component of the first MVD are within a first predefined range so that the horizontal component and/or the vertical component of the derived second MVD are in a second predefined range in a conformance bitstream.

In some examples, the first predefined range is different to the predefined range for a signaled MVD wherein the SMVD mode is not applied.

In some examples, the horizontal component and/or the vertical component of the first MVD is within the range of $[-2^N+1, 2^N-1]$ inclusively in a conformance bitstream, N being an integer.

In some examples, N=15, 16, 17 or 18.

In some examples, the horizontal component and/or the vertical component of the first MVD is within the range of $[-2^N+1, 2^N-1]$ inclusively in a conformance bitstream, N being an integer.

In some examples, the first MVD is a signaled MVD, and the range of the signaled MVD is set differently for SMVD mode or other tools that derives MVD from another reference picture list and for non-SMVD coding tools.

In some examples, the signaled MVD is within a range of $[-2^N+\text{SMVDFlag}, 2^N-1]$, wherein SMVDFlag is equal to 1 when the SMVD mode is applied and SMVDFlag is equal to 0 when SMVD mode is not applied.

In some examples, clipping or constraint on the MVD is performed before the MVD is modified according to precision of MV associated with the MVD.

In some examples, clipping or constraint on the MVD is performed after the MVD is modified according to precision of MV associated with the MVD.

In some examples, clipping or constraint on the MVD depend on precision of MV associated with the MVD.

In some examples, the conversion generates the block of video from the bitstream representation.

In some examples, the conversion generates the bitstream representation from the block of video.

In the listing of examples in this present disclosure, the term conversion may refer to the generation of the bitstream representation for the current video block or generating the current video block from the bitstream representation. The bitstream representation need not represent a contiguous group of bits and may be divided into bits that are included in header fields or in codewords representing coded pixel value information.

In the examples above, the applicability rule may be pre-defined and known to encoders and decoders.

It will be appreciated that the disclosed techniques may be embodied in video encoders or decoders to improve compression efficiency using techniques that include the use of various implementation rules of considerations regarding the use of a differential coding mode in intra coding, as described in the present disclosure.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
    determining, for a conversion between a block of a current picture of a video and a bitstream of the video, that a first coding mode is applied to the block based on a derivation process of two target reference pictures of the current picture, wherein the derivation process includes:
        performing a first step for searching a forward target reference picture in a reference picture list 0 and searching a backward target reference picture in a reference picture list 1,
        in response to at least one of the two target reference pictures not being found in the first step, resetting both target reference picture indices to be unavailable before a second step is invoked, and
        performing the second step for searching a backward target reference picture in the reference picture list 0 and searching a forward target reference picture in the reference picture list 1; and
    performing the conversion based on the determination,
    wherein in the first coding mode, a syntax structure indicating a motion vector difference of a reference picture list X is not present in the bitstream, and the motion vector difference of the reference picture list X is derived based on a motion vector difference of a reference picture list (1−X), wherein X is equal to 0 or 1.

2. The method of claim 1, wherein resetting both the target reference picture indices to be unavailable comprises resetting both RefIdxSymL0 and RefIdxSymL1 to −1, wherein RefIdxSymL0 indicates a target reference picture index in the reference picture list 0 and RefIdxSymL1 indicates a target reference picture index in the reference picture list 1.

3. The method of claim 1, wherein whether the first coding mode is allowable depends on whether both the target reference pictures are found in one step of the first step and the second step.

4. The method of claim 3, wherein when both the target reference pictures are found in the first step, the first coding mode is allowed.

5. The method of claim 3, wherein when both the target reference pictures are found in the second step, the first coding mode is allowed.

6. The method of claim 3, wherein when at least one of the two target reference pictures are not found in the first step and at least one of the two target reference pictures are not found in the second step, the first coding mode is disallowed.

7. The method of claim 1, wherein a picture order of the forward target reference picture is smaller than a picture order of the current picture and a picture order of the backward target reference picture is larger than the picture order of the current picture.

8. The method of claim 1, wherein the conversion includes decoding the block of video from the bitstream.

9. The method of claim 1, wherein the conversion includes encoding the block of video into the bitstream.

10. An apparatus for processing video data comprising a processor and a non-transitory memory with instructions thereon, wherein the instructions upon execution by the processor, cause the processor to:
    determine, for a conversion between a block of a current picture of a video and a bitstream of the video, that a first coding mode is applied to the block based on a derivation process of two target reference pictures of the current picture, wherein the derivation process includes:
        performing a first step for searching a forward target reference picture in a reference picture list 0 and searching a backward target reference picture in a reference picture list 1,
        in response to at least one of the two target reference pictures not being found in the first step, resetting both target reference picture indices to be unavailable before a second step is invoked, and performing the second step for searching a backward target reference picture in the reference picture list 0 and searching a forward target reference picture in the reference picture list 1; and perform the conversion based on the determination, wherein in the first coding mode, a syntax structure indicating a motion vector difference of a reference picture list X is not present in the bitstream, and the motion vector difference of the reference picture list X is derived based on a motion vector difference of a reference picture list (1−X), wherein X is equal to 0 or 1.

11. The apparatus of claim 10, wherein resetting both the target reference picture indices to be unavailable comprises resetting both RefIdxSymL0 and RefIdxSymL1 to −1, wherein RefIdxSymL0 indicates a target reference picture index in the reference picture list 0 and RefIdxSymL1 indicates a target reference picture index in the reference picture list 1.

12. The apparatus of claim 10, wherein whether the first coding mode is allowable depends on whether both the target reference pictures are found in one step of the first step and the second step.

13. The apparatus of claim 12, wherein when both the target reference pictures are found in the first step, the first coding mode is allowed.

14. The apparatus of claim 12, wherein when both the target reference pictures are found in the second step, the first coding mode is allowed.

15. The apparatus of claim 12, wherein when at least one of the two target reference pictures are not found in the first step and at least one of the two target reference pictures are not found in the second step, the first coding mode is disallowed.

16. The apparatus of claim 10, wherein a picture order of the forward target reference picture is smaller than a picture order of the current picture and a picture order of the backward target reference picture is larger than the picture order of the current picture.

17. A non-transitory computer-readable storage medium storing instructions that cause a processor to:

determine, for a conversion between a block of a current picture of a video and a bitstream of the video, that a first coding mode is applied to the block based on a derivation process of two target reference pictures of the current picture, wherein the derivation process includes:

performing a first step for searching a forward target reference picture in a reference picture list 0 and searching a backward target reference picture in a reference picture list 1, in response to at least one of the two target reference pictures not being found in the first step, resetting both target reference picture indices to be unavailable before a second step is invoked, and performing the second step for searching a backward target reference picture in the reference picture list 0 and searching a forward target reference picture in the reference picture list 1; and perform the conversion based on the determination, wherein in the first coding mode, a syntax structure indicating a motion vector difference of a reference picture list X is not present in the bitstream, and the motion vector difference of the reference picture list X is derived based on a motion vector difference of a reference picture list (1−X), wherein X is equal to 0 or 1.

18. The non-transitory computer-readable storage medium of claim 17, wherein resetting both the target reference picture indices to be unavailable comprises resetting both RefIdxSymL0 and RefIdxSymL1 to −1, wherein RefIdxSymL0 indicates a target reference picture index in the reference picture list 0 and RefIdxSymL1 indicates a target reference picture index in the reference picture list 1.

19. The non-transitory computer-readable storage medium of claim 17, wherein a picture order of the forward target reference picture is smaller than a picture order of the current picture and a picture order of the backward target reference picture is larger than the picture order of the current picture.

20. A non-transitory computer-readable recording medium storing a bitstream of a video which is generated by a method performed by a video processing apparatus, wherein the method comprises:

determining, for a conversion between a block of a current picture of the video and the bitstream of the video, that a first coding mode is applied to the block based on a derivation process of two target reference pictures of the current picture, wherein the derivation process includes:

performing a first step for searching a forward target reference picture in a reference picture list 0 and searching a backward target reference picture in a reference picture list 1, in response to at least one of the two target reference pictures not being found in the first step, resetting both target reference picture indices to be unavailable before a second step is invoked, and performing the second step for searching a backward target reference picture in the reference picture list 0 and searching a forward target reference picture in the reference picture list 1; and performing the conversion based on the determination, wherein in the first coding mode, a syntax structure indicating a motion vector difference of a reference picture list X is not present in the bitstream, and the motion vector difference of the reference picture list X is derived based on a motion vector difference of a reference picture list (1−X), wherein X is equal to 0 or 1.

* * * * *